(12) United States Patent
Ohnishi et al.

(10) Patent No.: US 9,382,012 B2
(45) Date of Patent: Jul. 5, 2016

(54) UNMANNED HELICOPTER

(71) Applicant: Yamaha Hatsudoki Kabushiki Kaisha, Iwata-shi, Shizuoka (JP)

(72) Inventors: Shintaro Ohnishi, Shizuoka (JP); Tsuyoshi Ishizaki, Shizuoka (JP); Ikuhiko Hirami, Shizuoka (JP); Masanori Yoshihara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 22 days.

(21) Appl. No.: 14/415,179

(22) PCT Filed: Jul. 18, 2013

(86) PCT No.: PCT/JP2013/069562
§ 371 (c)(1),
(2) Date: Jan. 20, 2015

(87) PCT Pub. No.: WO2014/014072
PCT Pub. Date: Jan. 23, 2014

(65) Prior Publication Data
US 2015/0183521 A1    Jul. 2, 2015

(30) Foreign Application Priority Data

Jul. 20, 2012  (JP) ................................. 2012-161594

(51) Int. Cl.
*B64C 27/00* (2006.01)
*B64D 33/10* (2006.01)
(Continued)

(52) U.S. Cl.
CPC ................ *B64D 33/10* (2013.01); *B64C 27/04* (2013.01); *B64C 39/024* (2013.01); *B64C 2201/024* (2013.01); *B64C 2201/108* (2013.01)

(58) Field of Classification Search
CPC ........ B64C 33/10; B64C 27/04; B64C 27/10; B64C 27/12; B64C 39/024; B64C 2201/024; B64C 2201/108; B64D 33/02; B64D 33/08; B64D 33/10; B64D 13/006; B64D 2013/0611; B64D 2013/0618
USPC .................................... 244/17.11; 454/69–76
See application file for complete search history.

(56) References Cited

U.S. PATENT DOCUMENTS

2009/0069957 A1* 3/2009 Nakamura ............ B64C 39/024
                                                                    701/3
2010/0181416 A1   7/2010 Sakamoto et al.
2010/0230530 A1   9/2010 Nannoni et al.

FOREIGN PATENT DOCUMENTS

JP          04-27698 A      1/1992
JP          10-263215 A     10/1998
(Continued)

OTHER PUBLICATIONS

English translation of Official Communication issued in corresponding International Application PCT/JP2013/069562, mailed on Jan. 29, 2015.

(Continued)

*Primary Examiner* — Christopher P Ellis
*Assistant Examiner* — Richard G Davis
(74) *Attorney, Agent, or Firm* — Keating and Bennett, LLP

(57) ABSTRACT

A helicopter includes a mast, a main rotor, an engine, a radiator, and a body cover. The engine and the radiator are housed in the body cover. The body cover includes a first opening penetrated by the mast, a second opening that is located at a more forward position than the first opening and configured to introduce air to the radiator, and a third opening located at a position that is more forward than the first opening and more rearward than the radiator. The third opening is located at a higher position than the second opening and the radiator.

13 Claims, 23 Drawing Sheets

(51) Int. Cl.
  *B64C 27/04* (2006.01)
  *B64C 39/02* (2006.01)

(56) References Cited

FOREIGN PATENT DOCUMENTS

| JP | 2002-193193 | A | 7/2002 |
| JP | 3410304 | B2 | 5/2003 |
| JP | 2004-249942 | A | 9/2004 |
| JP | 2004-268730 | A | 9/2004 |
| JP | 2004-345602 | A | 12/2004 |
| JP | 2009-298399 | A | 12/2009 |
| JP | 4574841 | B2 | 11/2010 |
| KR | 10-2007-0031267 | A | 3/2007 |
| KR | 10-2008-0005967 | A | 1/2008 |
| KR | 10-2009-0128345 | A | 12/2009 |

OTHER PUBLICATIONS

Official Communication issued in International Patent Application No. PCT/JP2013/069562, mailed on Oct. 15, 2013.

* cited by examiner

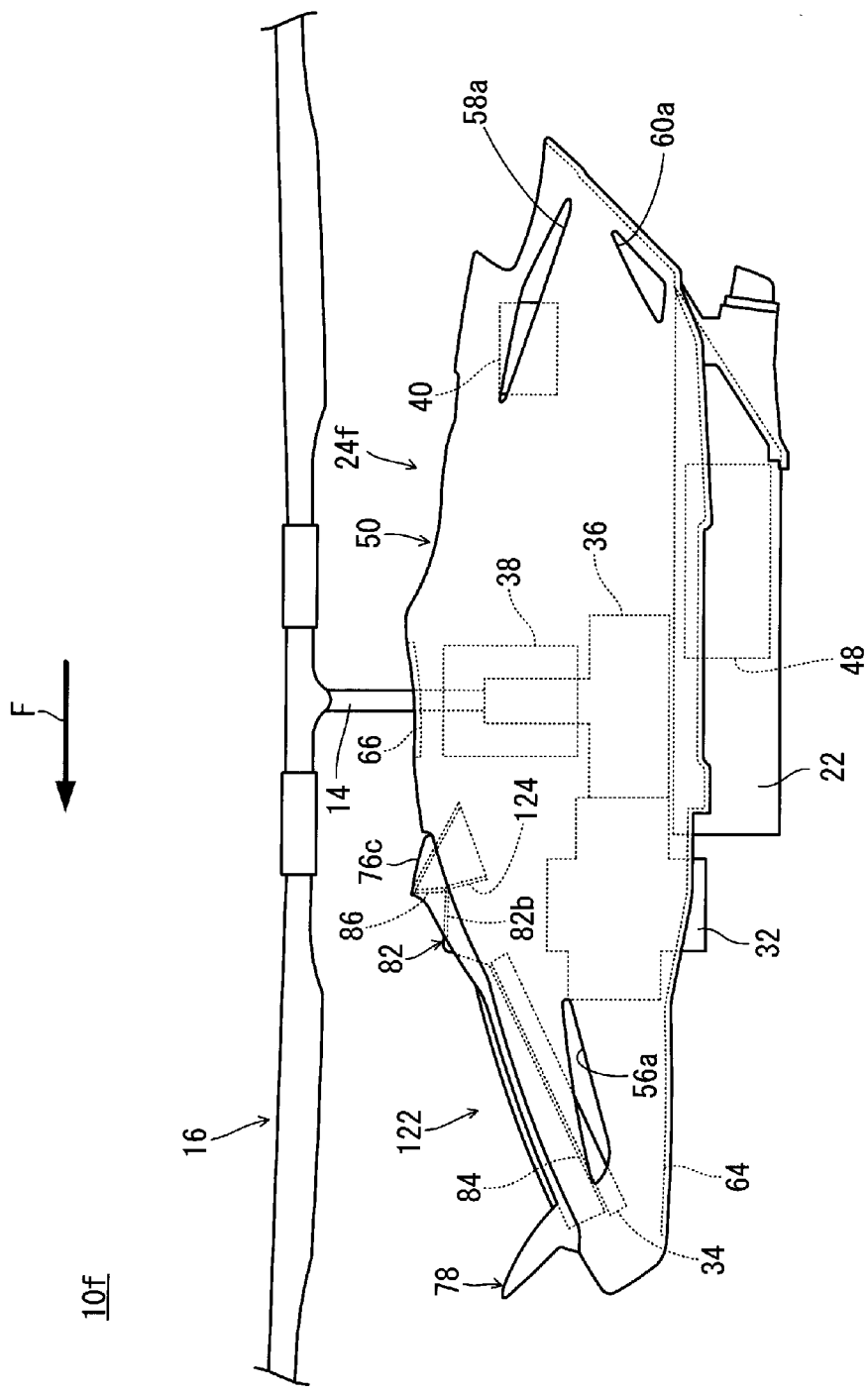

UNMANNED HELICOPTER

BACKGROUND OF THE INVENTION

1. Field of the Invention

The present invention relates to unmanned helicopters, and more specifically to an unmanned helicopter including a body cover including a plurality of air vent portions.

2. Description of the Related Art

There is a conventional unmanned helicopter which includes a body cover having a plurality of air vent portions (e.g., holes for air to pass through). For example, JP-B No. 4574841 discloses an unmanned helicopter which includes a main rotor, an engine for driving the main rotor, a body cover covering the engine, and a radiator through which an engine cooling water circulates. The radiator is located at an opening of the body cover. The body cover includes a first vent hole provided below the radiator, a second vent hole provided behind the engine and on an upper surface side of the body cover below the main rotor, and a third vent hole provided behind the engine and on a lower surface side of the body cover. Accordingly, in the unmanned helicopter it is possible to allow outside air to flow into the body cover, and allow air inside the body cover to flow out via the opening, the first vent hole, the second vent hole, and the third vent hole. This arrangement makes it possible to reduce a temperature increase of the air inside the body cover, thus reducing a temperature increase of various components of the unmanned helicopter (such as the engine, control devices, etc.)

In the field of the unmanned helicopters as described above, there is a demand in recent years for the use of high-performance engines. However, if a high performance engine is used, the amount of heat generated by the engine increases, and the engine temperature tends to increase. This tends to increase the temperature inside the body cover. In particular, when the unmanned helicopter is flying forward at a high speed, the engine has a high output and therefore the engine generates a large amount of heat. As a solution for this problem, the unmanned helicopter according to JP-B No. 4574841 includes a plurality of radiators in order to reduce the increase in the engine temperature. However, in this case, the unmanned helicopter has an increased weight.

SUMMARY OF THE INVENTION

Therefore, preferred embodiments of the present invention provide an unmanned helicopter that reduces or prevents a temperature increase inside a body cover while reducing or preventing an increase in the weight of the unmanned helicopter.

According to a preferred embodiment of the present invention, an unmanned helicopter includes a main rotor; a rotor shaft supporting the main rotor and extending in an up-down direction; an engine disposed below the main rotor at a more forward position than the rotor shaft and configured to drive the rotor shaft; a radiator disposed at a more forward position than the engine and configured to dissipate heat from the engine; and a body cover that houses the engine and the radiator. In the unmanned helicopter, the body cover includes a first air vent portion penetrated by the rotor shaft; a second air vent portion at a position more forward than the first air vent portion and configured to introduce air to the radiator; and a third air vent portion at a position more forward than the first air vent portion and more rearward than the radiator. Further, at least a portion of the third air vent portion is located at a position higher than the second air vent portion and the radiator.

In a preferred embodiment of the present invention, during hovering, downwash from the main rotor flows through the second air vent portion and the radiator and is introduced inside the body cover. During this process, the radiator dissipates heat and a temperature increase in the engine is significantly reduced or prevented. As air flows from the second air vent portion into the body cover, the air inside the body cover is discharged from the first air vent portion and the third air vent portion to an outside of the body cover. Particularly, rotation of the main rotor generates an updraft around the rotor shaft such that the air inside the body cover is discharged efficiently out of the body cover via the first air vent portion. Due to these processes, it is possible to efficiently replace the air inside the body cover. When the unmanned helicopter is flying forward, downwash from the main rotor flows through the second air vent portion and the radiator and is introduced inside the body cover similarly to that of hovering. Also, since at least a portion of the third air vent portion is located at a position which is higher than the second air vent portion and the radiator and more rearward than the radiator, air from ahead of the unmanned helicopter is introduced efficiently into the body cover via the third air vent portion. As the air flows into the body cover from the second air vent portion and the third air vent portion, air inside the body cover is discharged from the first air vent portion to an outside of the body cover. Particularly, as an updraft is generated around the rotor shaft, the air inside the body cover is discharged efficiently via the first air vent portion. When the unmanned helicopter is flying backward, air inside the body cover is discharged from the first air vent portion and the third air vent portion to an outside of the body cover. Especially, due to the arrangement in which the third air vent portion is located at a position which is more forward than the first air vent portion and more rearward than the radiator, the air inside the body cover is discharged efficiently via the third air vent portion to an outside of the body cover. As described above, it is possible to efficiently replace the air inside the body cover by the first air vent portion, the second air vent portion, and the third air vent portion. Thus, it is possible to significantly reduce or prevent a temperature increase inside the body cover without utilizing plural radiators. In other words, it is possible to significantly reduce or prevent a temperature increase inside the body cover while significantly reducing or preventing an increase in the weight of the unmanned helicopter.

Preferably, the first air vent portion, the second air vent portion, and the third air vent portion are defined by openings which are independent from each other. In this case, it is possible to design the first air vent portion, the second air vent portion, and the third air vent portion appropriately without any of the openings being affected by the other openings. Therefore, it is possible, for example, to configure the second air vent portion and the third air vent portion so that the flows of air introduced from the second air vent portion and the third air vent portion into the body cover have specific directions. In this case, it is possible to significantly reduce or prevent a temperature increase inside the body cover more efficiently.

In another preferred embodiment of the present invention, the second air vent portion and the third air vent portion are included in a common opening, whereas the first air vent portion is provided by another opening which is independent from the common opening. In this case, it is easy to manufacture the body cover since the second air vent portion and the third air vent portion are included in one common opening.

In another preferred embodiment of the present invention, the first air vent portion, the second air vent portion, and the third air vent portion are included in one common opening. In this case, it is even easier to manufacture the body cover.

Preferably, the body cover further includes a guide portion which introduces air from ahead of the body cover into the body cover. In this case, it is possible to introduce air from ahead efficiently into the body cover by the guide portion.

Further preferably, the guide portion is located at a more rearward and higher position than the second air vent portion, and extends from low to high toward a point which is obliquely forward and upward of the body cover to expose its lower surface in a front view. In this case, it is possible to introduce air into the body cover with a simple arrangement.

Further, preferably, the body cover includes a first tube shaped portion extending from low to high toward a point which is obliquely forward and upward of the body cover, and the third air vent portion is located at an upper end portion of the first tube shaped portion. In this case, it is possible to introduce downwash from the main rotor into the body cover via the third air vent portion, in addition to the air from ahead of the unmanned helicopter. This makes it possible to significantly reduce or prevent a temperature increase inside the body cover more efficiently.

Preferably, the third air vent portion opens downward. In this case, the arrangement makes it less likely or impossible that rain water, dust and dirt, etc. will enter from the third air vent portion into the body cover.

Further preferably, the body cover includes an upper wall portion and a lower wall portion which define the third air vent portion, the upper wall portion extends from front to rear from the third air vent portion in an obliquely rearward and upward direction, and the lower wall portion extends from front to rear from the third air vent portion in an obliquely rearward and upward direction below the upper wall. In this case, even if rain water, dust and dirt, etc. have passed through the third air vent portion, it is possible to sufficiently prevent the rain water, dust, and dirt, etc. from entering inside the body cover by the upper wall portion and the lower wall portion.

Further, preferably, the body cover further includes a second tube shaped portion extending toward the inside of the body cover. In this case, it is possible to efficiently cool a cooling target (e.g., engine) by orienting the second tube shaped portion to the cooling target.

Preferably, the third air vent portion is above the engine. In this case, during hovering and backward flight, air inside the body cover, especially air around the engine, is discharged efficiently via the third air vent portion to an outside of the body cover. This makes it possible to significantly reduce or prevent a temperature increase inside the body cover.

Further preferably, the body cover further includes a fourth air vent portion at a more rearward position than the first air vent portion. In this case, air inside the body cover is discharged also from the fourth air vent portion during forward flight. This makes it possible to replace the air inside the body cover more efficiently. Also, when the unmanned helicopter is flying backward, it is possible to introduce downwash from the main rotor and/or air from the direction of the flight (air from the rear) through the fourth air vent portion into the body cover. This makes it possible to significantly reduce or prevent a temperature increase inside the body cover when the unmanned helicopter is flying backward.

Further, preferably, the unmanned helicopter further includes a frame which supports the engine, and an attitude detector which detects the attitude of the unmanned helicopter. With the above, at least a portion of the fourth air vent portion is located at a position higher than the frame and more rearward than the rotor shaft, and at least a portion of the attitude detector is located at a position higher than the frame and more rearward than the rotor shaft. In this case, air which is introduced from the second air vent portion and the third air vent portion to the fourth air vent portion, or air which is introduced from the fourth air vent portion to the first air vent portion and the third air vent portion is more likely to pass above the frame because at least a portion of the fourth air vent portion is located at a position that is higher than the frame and more rearward than the rotor shaft. In the unmanned helicopter, at least a portion of the attitude detector is also located at a position that is higher than the frame and more rearward than the rotor shaft. Therefore, it is possible to cool the attitude detector efficiently with the air which is introduced from the second air vent portion and the third air vent portion to the fourth air vent portion, or the air which is introduced from the fourth air vent portion to the first air vent portion and the third air vent portion.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 23 is a side view showing a primary portion of a helicopter according to still another preferred embodiment of the present invention.

DETAILED DESCRIPTION OF THE PREFERRED EMBODIMENTS

Figure 1:
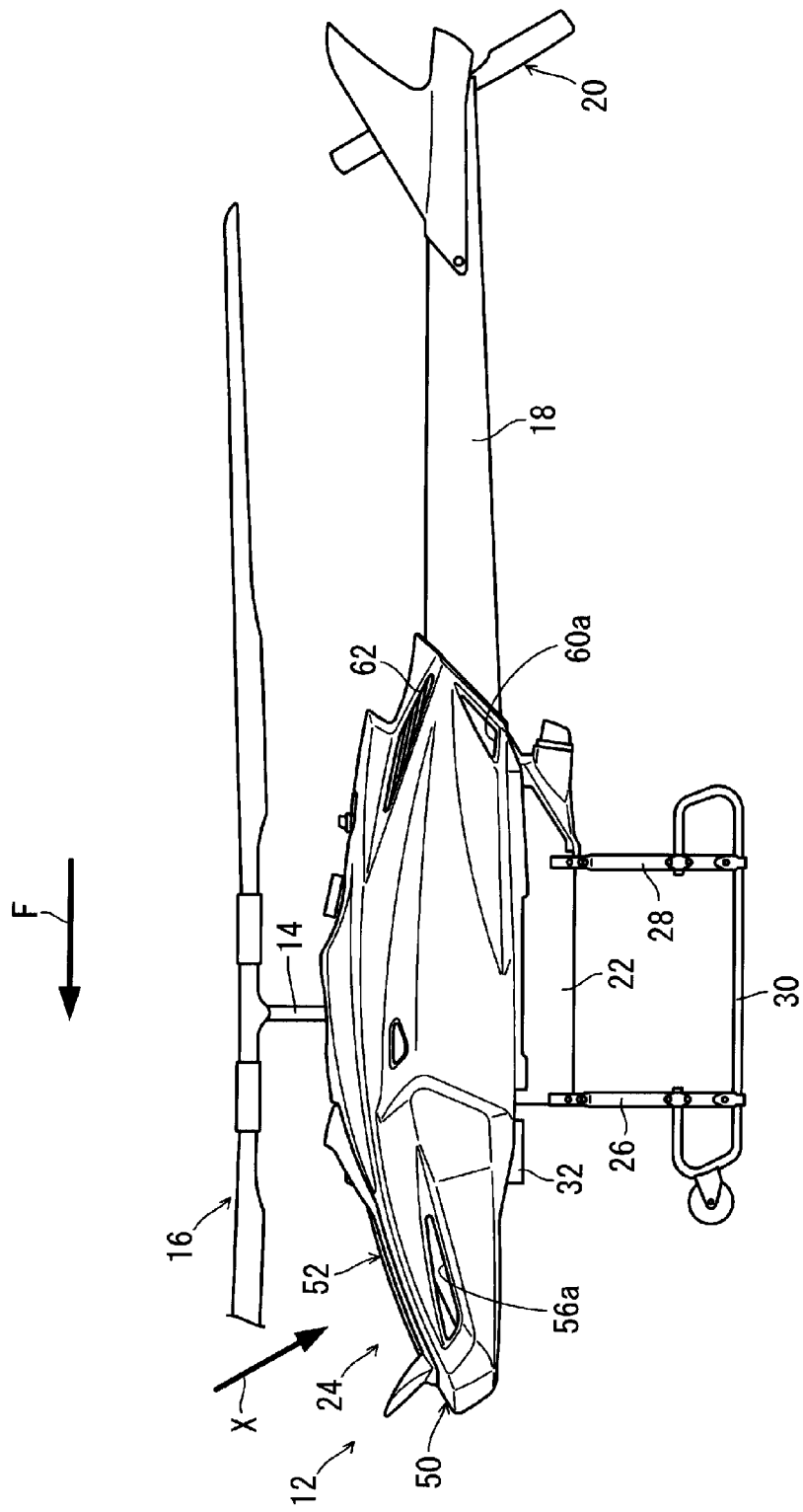
FIG. 1 is a side view showing a helicopter according to a preferred embodiment of the present invention.

Hereinafter, preferred embodiments of the present invention will be described with reference to the drawings. FIG. 1 is a side view which shows an unmanned helicopter 10 (hereinafter simply called helicopter 10) according to a preferred embodiment of the present invention. It is noted that the terms front and rear, left and right, up and down as used in the preferred embodiments are determined from a basic attitude of the helicopter 10 (an attitude of the unmanned helicopter 10 when its mast 14 is parallel or substantially parallel to the vertical direction). In the drawings, Arrow F indicates a forward direction.

Referring to FIG. 1, the helicopter 10 includes a main body 12, the mast 14, a main rotor 16, a tail body 18, and a tail rotor 20. In the present preferred embodiment, the mast 14 represents the rotor shaft.

The main body 12 includes a frame 22, a body cover 24, a pair of leg portions 26 (FIG. 1 shows only the left leg portion 26), a pair of leg portions 28 (FIG. 1 shows only the left leg portion 28), and a pair of skids 30 (FIG. 1 shows only the left skid 30).

The frame 22 is preferably rectangular or substantially rectangular in a front view, and extends in a fore-aft direction. The tail body 18 and the body cover 24 are supported by the frame 22.

The pair of leg portions 26 are attached to two side surfaces of the frame 22. The pair of leg portions 28 are attached to the two side surfaces of the frame 22 at more rearward positions than the pair of leg portions 26. The pair of skids 30 are attached side by side in a left-right direction to the pair of leg portions 26 and the pair of leg portions 28. Specifically, the skid 30 on one side (left side) is attached to the leg portions 26, 28 on one side (left side), whereas the skid 30 (not illustrated) on the other side (right side) is attached to the leg portions 26, 28 (not illustrated) on the other side (right side).

The mast 14 protrudes upward from the body cover 24, and is rotatable. The mast 14 includes an upper end portion where the main rotor 16 is fixed. Thus, the mast 14 and the main rotor 16 rotate integrally with each other. The tail body 18 preferably is cylindrical or substantially cylindrical and extends to a more rearward position than the main body 12. The tail rotor 20 is rotatable and is located at a rearward end portion of the tail body 18.

Figure 2:
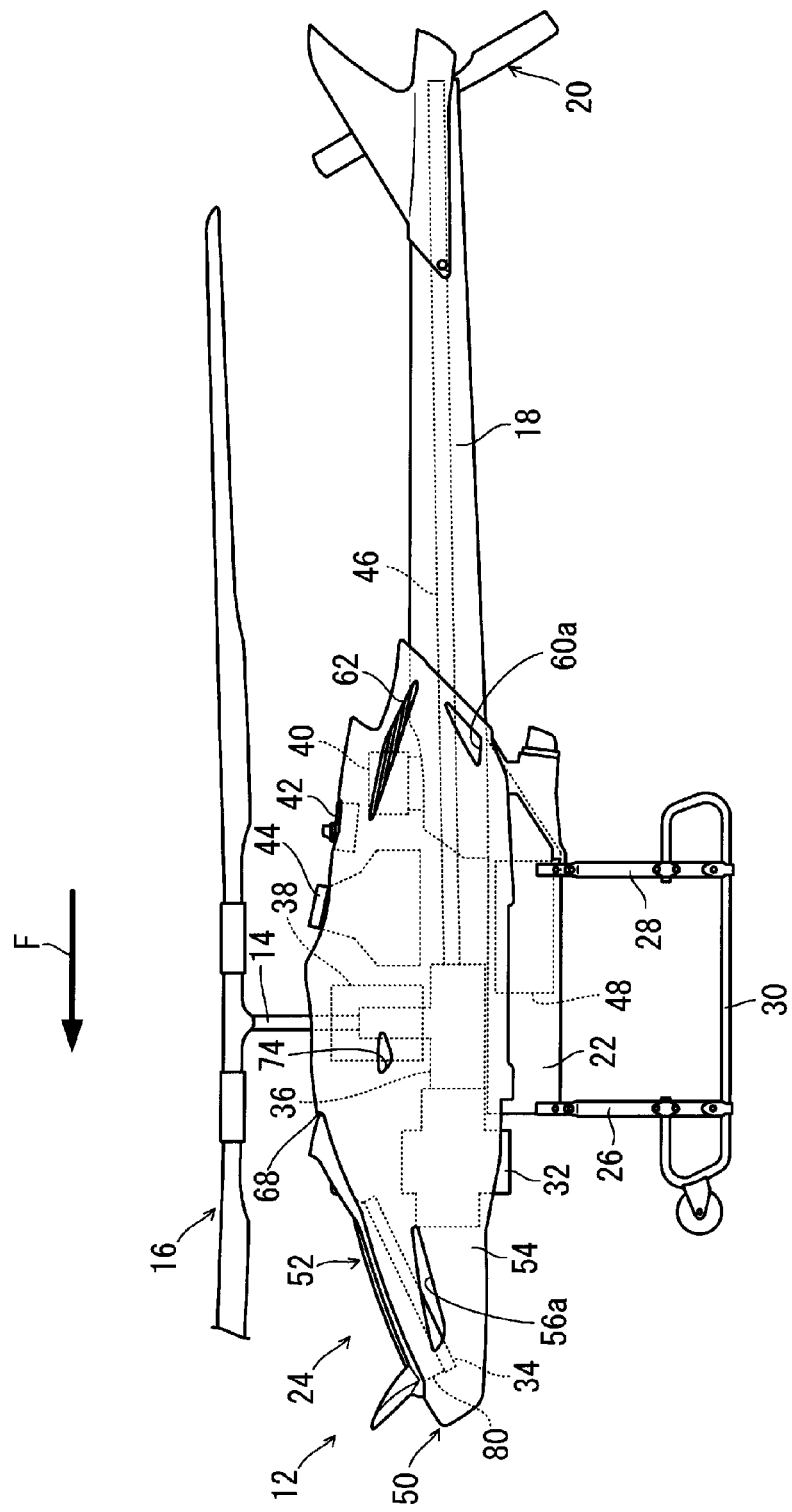
FIG. 2 is a side view showing an internal structure of the helicopter.

FIG. 2 is a side view showing an internal structure of the helicopter 10. In FIG. 2, the internal structure of the helicopter 10 is illustrated in a simplified manner in order to avoid a complicated view. Referring to FIG. 2, the tail body 18 includes a forward end portion that is supported by a rearward end portion of the frame 22 inside the body cover 24. The body cover 24 houses an engine 32, a radiator 34, a transmission 36, an electric component 38, an attitude detector 40, a switch unit 42, and a fuel tank 44.

The engine 32 is supported by a forward end portion of the frame 22 below the main rotor 16. Further, the engine 32 is preferably located at a more forward position than the mast 14. The engine 32 is, for example, a horizontally-opposed multi-cylinder engine. The radiator 34 is preferably located at a more forward position than the engine 32. In the present preferred embodiment, the radiator 34 is located at an obliquely forward and upward position of the engine 32. The radiator 34 is connected to the engine 32 via an unillustrated connecting member, and dissipates heat from the engine 32. The radiator 34 is preferably rectangular or substantially rectangular in a plan view, and is installed so that its upper surface faces an obliquely forward and upward direction.

The transmission 36 is supported by the frame 22 behind the engine 32. The transmission 36 is connected to an unillustrated crank shaft of the engine 32. The mast 14 extends upward from the transmission 36, while a rotating shaft 46 extends rearward from the transmission 36. The rotating shaft 46 extends in a fore-aft direction inside the main body 12 and the tail body 18. The tail rotor 20 is connected to a rearward end portion of the rotating shaft 46. A driving force generated by the engine 32 is transmitted to the mast 14 and the rotating shaft 46 via the transmission 36. This causes rotation of the mast 14 and the rotating shaft 46 causing the main rotor 16 and the tail rotor 20 to rotate.

The electric component 38 is disposed around the mast 14. In the present preferred embodiment, the electric component 38 preferably includes a plurality of servo motors to adjust a blade angle of the main rotor 16. The attitude detector 40 is supported at a forward end portion of the tail body 18. The attitude detector 40 detects an attitude of the helicopter 10. The attitude detector 40 includes a gyro sensor, for example.

The switch unit 42 is located at an obliquely forward and upward position of the attitude detector 40. The switch unit 42 includes an upper end portion that protrudes upward from the main body 12. The switch unit 42 includes a plurality of switches (such as a starter switch to start the engine). The fuel tank 44 is located at a position forward of the switch unit 42. The fuel tank 44 includes an upper end portion that protrudes upward from the main body 12.

A control device 48 is placed inside the frame 22. The control device 48 is configured or programmed to control various components installed in the helicopter 10. In the present preferred embodiment, the control device 48 is electrically connected to the electric component 38, the attitude detector 40, and the switch unit 42. The control device 48 controls the electric component 38 based on the attitude of the helicopter 10 detected by the attitude detector 40, thus adjusting the attitude of the helicopter 10.

Figure 3:
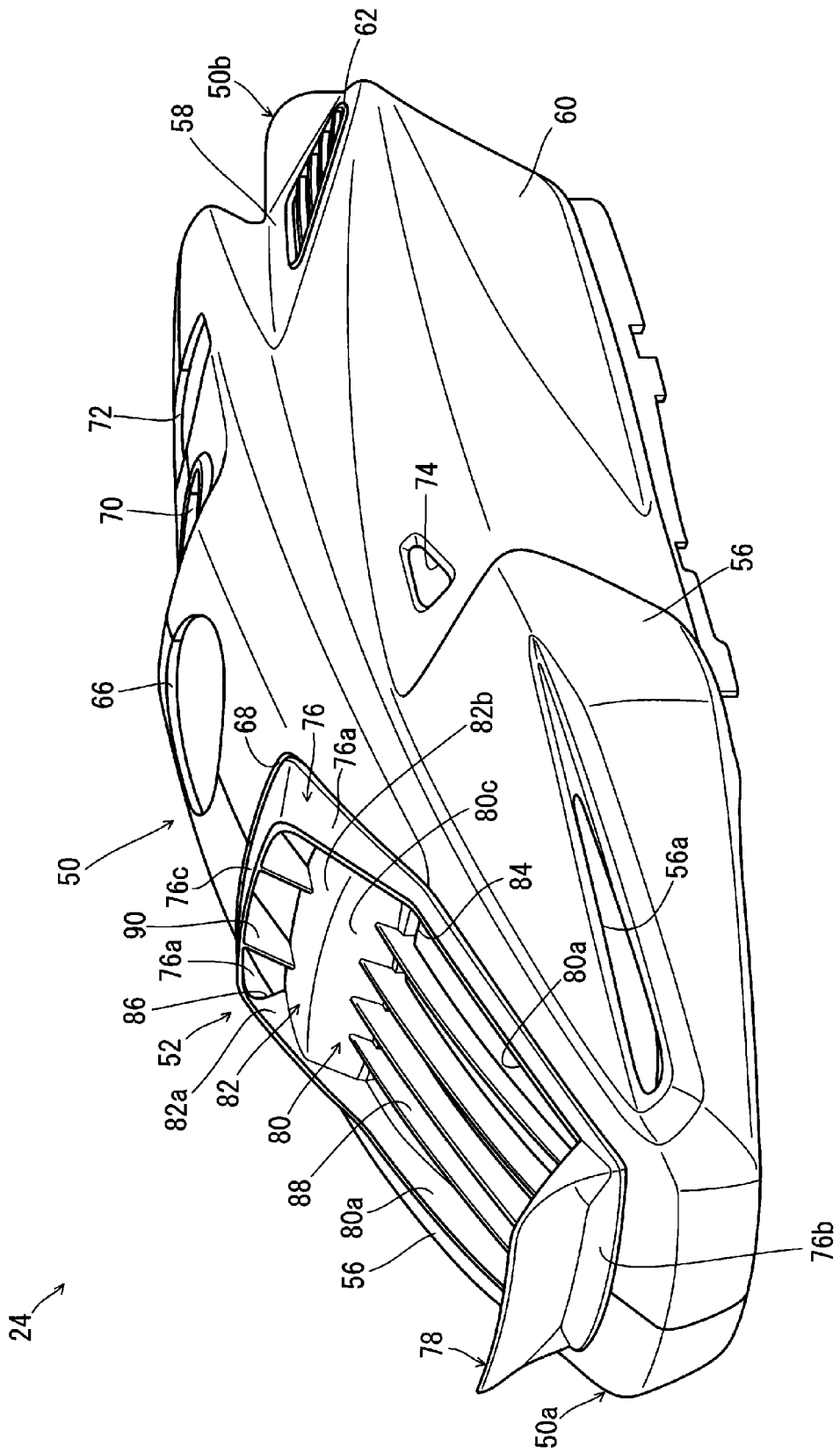
FIG. 3 is a perspective view of a body cover.
Figure 4:
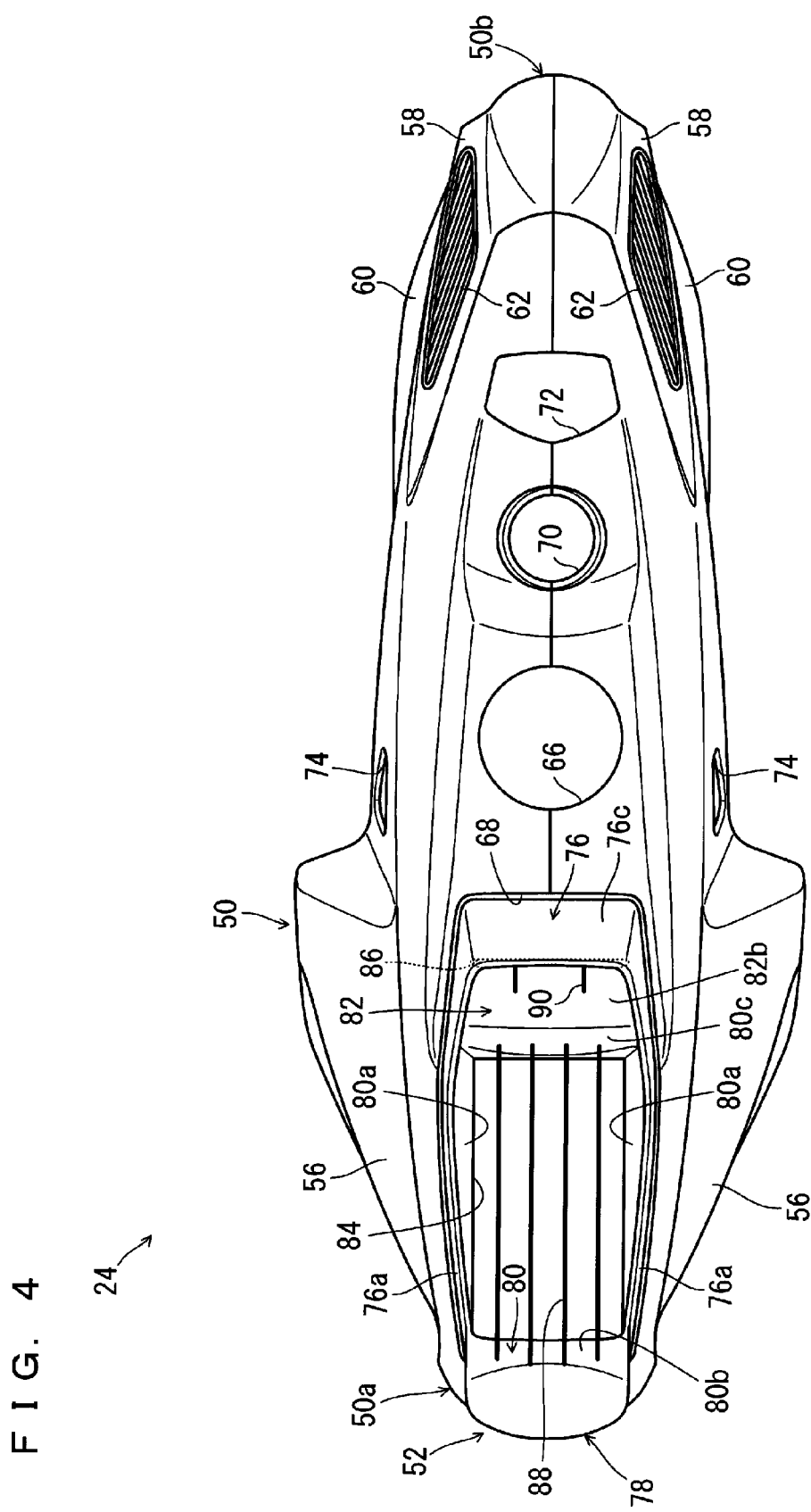
FIG. 4 is a plan view of the body cover.

FIG. 3 is a perspective view showing the body cover 24, whereas FIG. 4 is a plan view showing the body cover 24. Referring to FIG. 3 and FIG. 4, the body cover 24 is preferably symmetrical with respect to the left-right direction. The body cover 24 includes a first cover 50 and a second cover 52.

Figure 5:
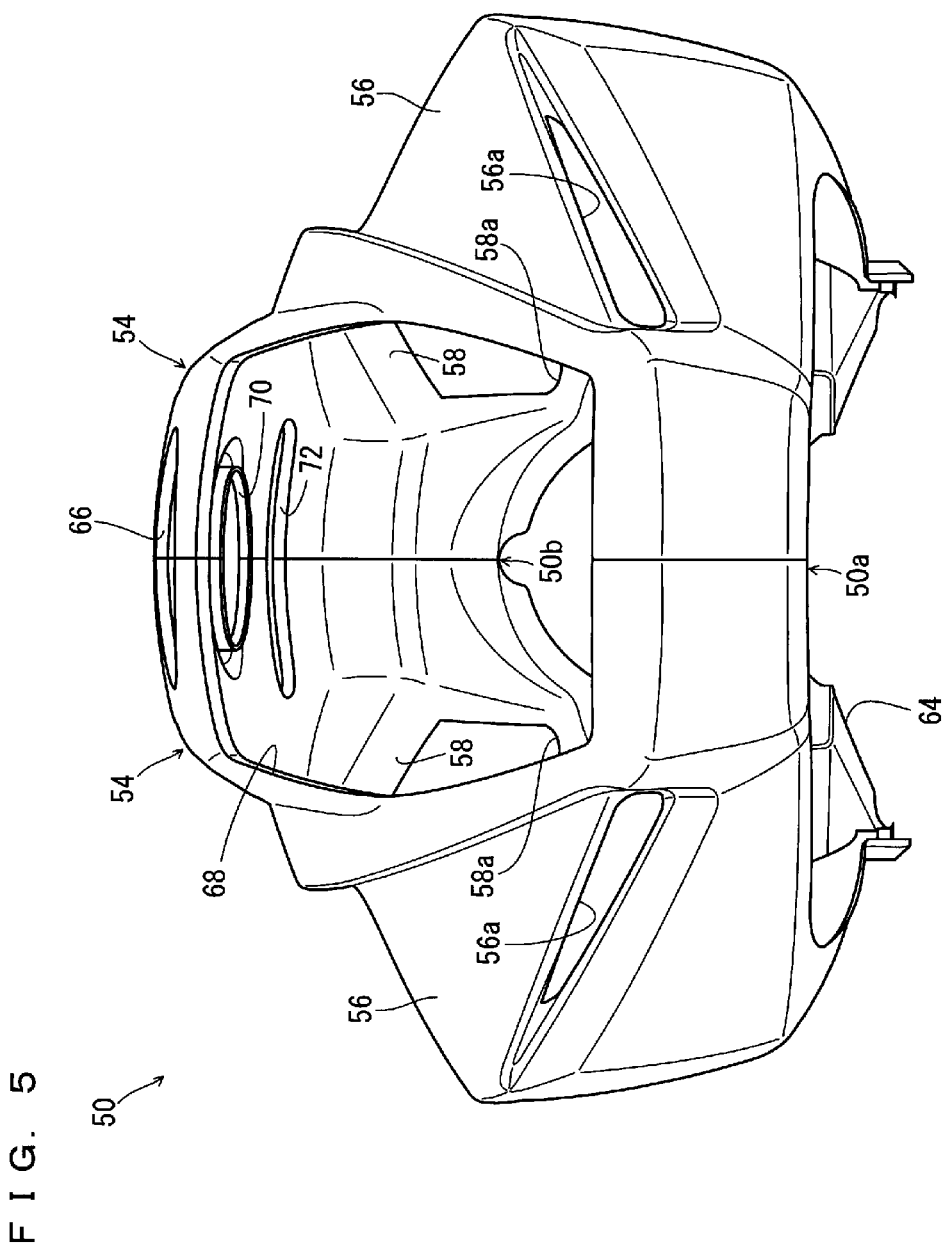
FIG. 5 is a front view of a first cover.
Figure 6:
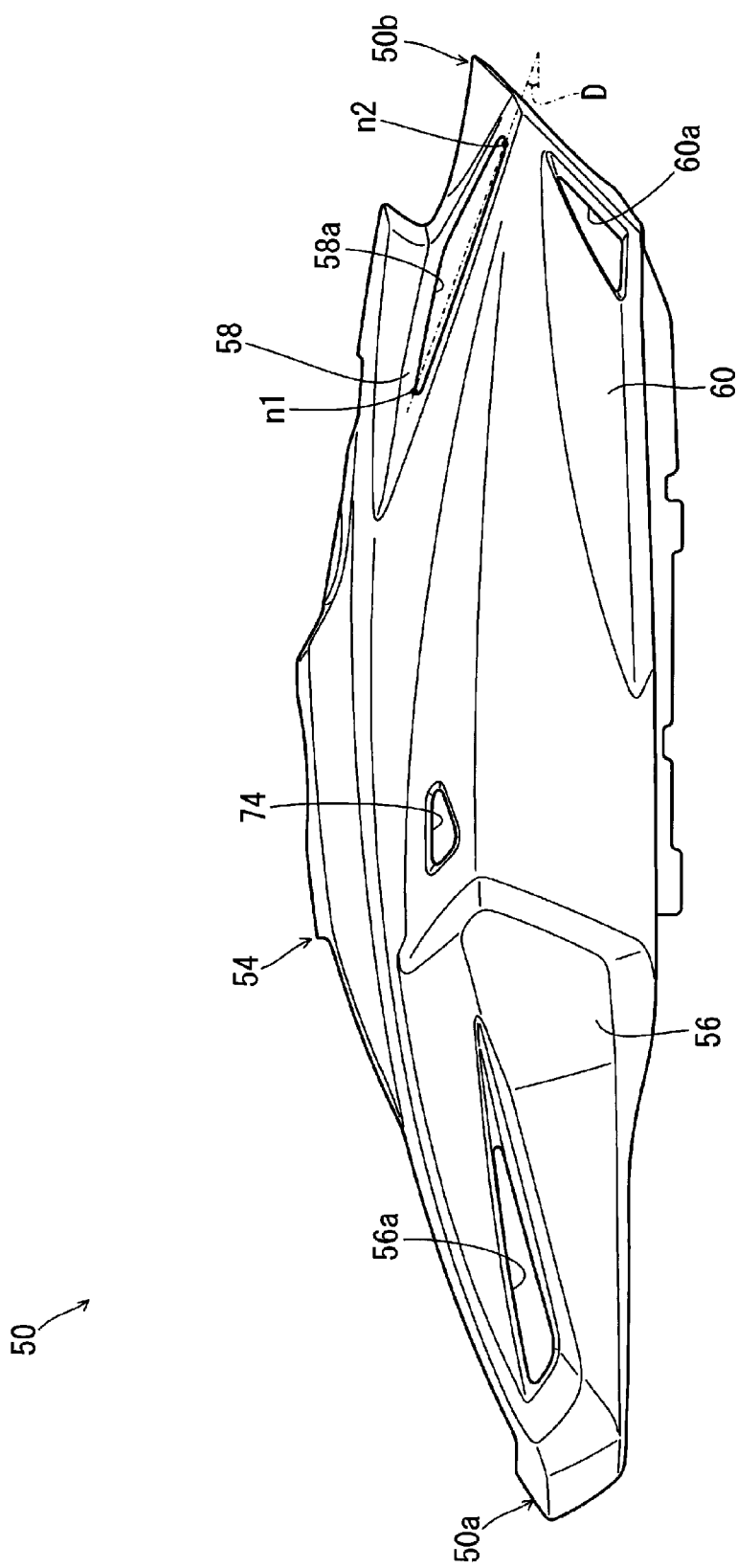
FIG. 6 is a side view of the first cover.
Figure 7:
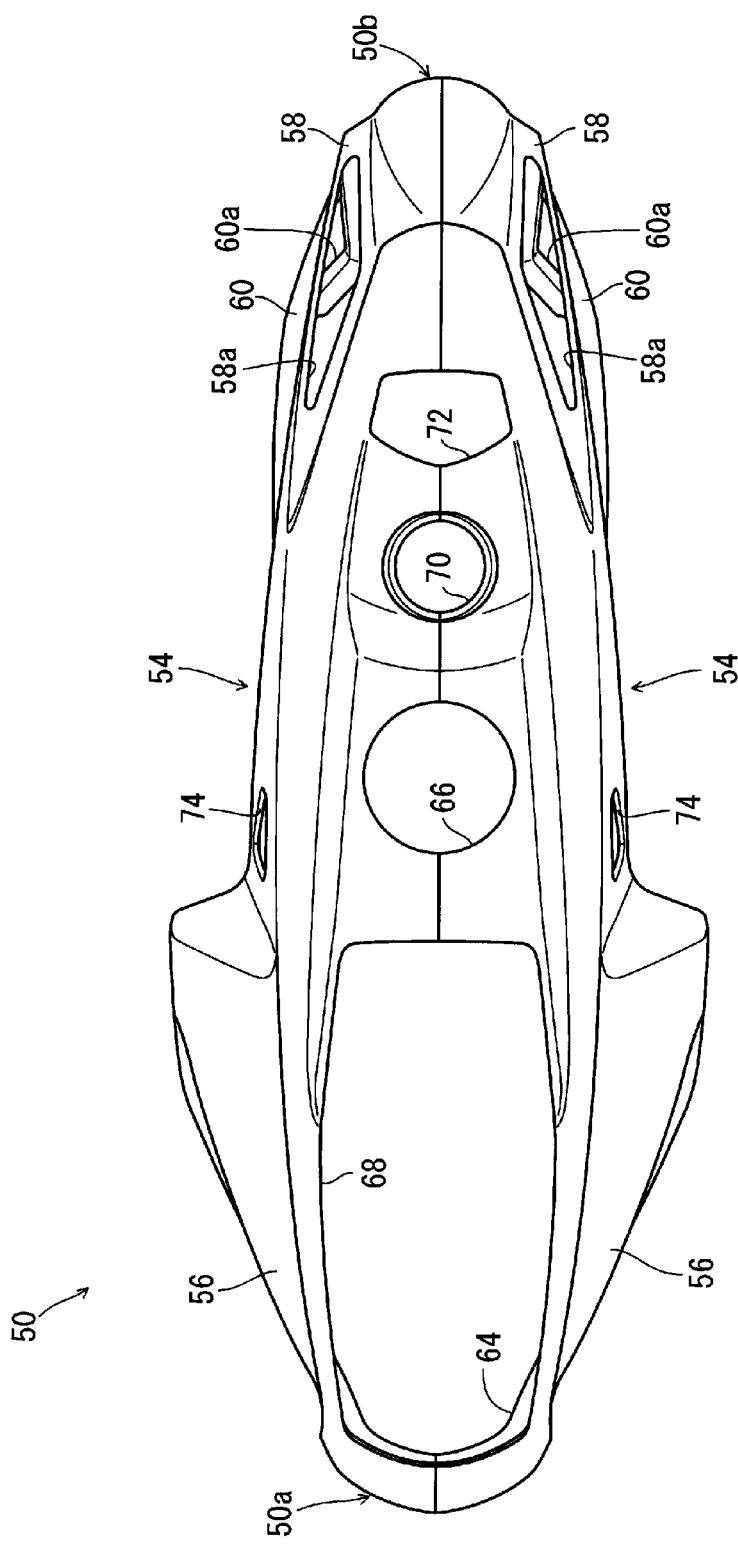
FIG. 7 is a plan view of the first cover.
Figure 8:
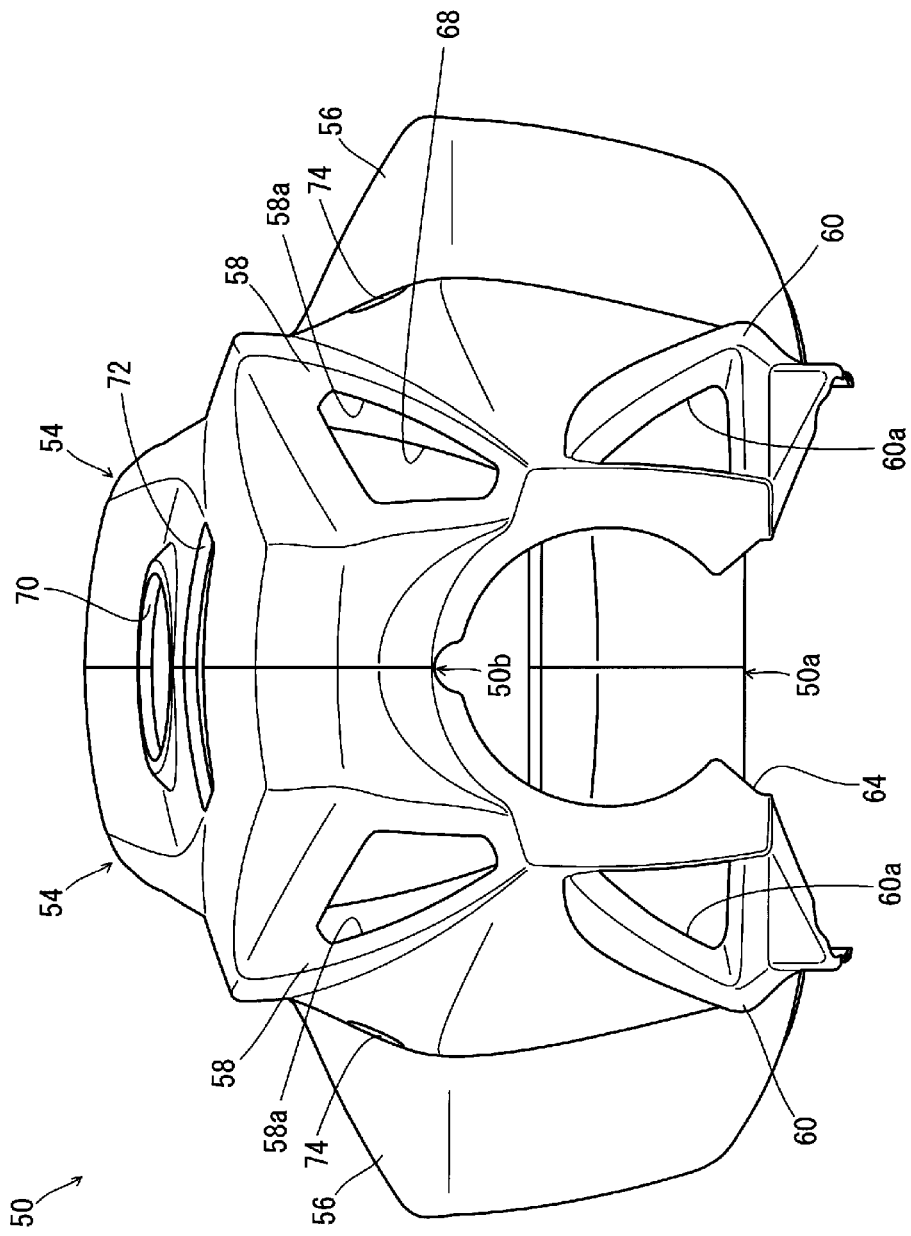
FIG. 8 is a rear view of the first cover.

FIG. 5 is a front view showing the first cover 50, FIG. 6 is a side view showing the first cover 50, FIG. 7 is a plan view showing the first cover 50, and FIG. 8 is a rear view showing the first cover 50.

Referring to FIG. 5 through FIG. 8, in the present preferred embodiment, the first cover 50 is divided into a left half and a right half, and includes a pair of side covers 54. One of the side covers 54 has a shape obtained by flipping the other side cover 54 with respect to a left-right direction. Referring to FIG. 2, the pair of side covers 54 are fixed to each other to sandwich the engine 32, the radiator 34, the transmission 36, the electric component 38, the attitude detector 40, the switch unit 42, and the fuel tank 44 from the left and right.

Referring to FIG. 1 through FIG. 3 and FIG. 6, the first cover 50 preferably has a streamlined shape. Specifically, referring to FIG. 6, the first cover 50 expands gradually from its forward end portion 50a to its intermediate portion in terms of a fore-aft direction in a side view, and then narrows so that its rearward end portion 50b has a sharpened end pointing in an obliquely rearward and upward direction.

Referring to FIG. 3 through FIG. 8, the first cover 50 includes a pair of bulging portions 56, a pair of bulging portions 58, and a pair of bulging portions 60. Referring to FIG. 5, FIG. 7, and FIG. 8, the pair of bulging portions 56 are located at a front portion of the first cover 50. Referring to FIG. 7, the pair of bulging portions 56 extend rearward from the forward end portion 50a while gradually expanding in a left-right direction (a width direction of the helicopter 10).

Referring to FIG. 3 through FIG. 6, each of the bulging portions 56 includes an opening 56a. In the present preferred embodiment, each opening 56a opens outward and forward in a width direction of the first cover 50. Referring to FIG. 5, the opening 56a extends obliquely upward from the inside toward the outside of the first cover 50 so that its width in an up-down direction becomes narrower as it extends outward in a front view. Referring to FIG. 6, the opening 56a extends obliquely upward from the front toward the rear so that its width in an up-down direction becomes narrower as it extends rearward in a side view.

Referring to FIG. 3 and FIG. 6 through FIG. 8, the bulging portions 58, 60 are located at a rear portion of the first cover 50. The bulging portions 58 are located above the bulging portions 60. Referring to FIG. 8, the bulging portions 58 expand outward and obliquely upward in a rear view. The bulging portions 60 expand outward and obliquely downward in a rear view.

Referring to FIG. 6 through FIG. 8, each of the bulging portions 58 includes a triangular or substantially triangular opening 58a. Each opening 58a opens at least upward and rearward. In other words, each opening 58a is visible (not hidden) in a plan view and in a rear view of the helicopter 10. In the present preferred embodiment, each opening 58a opens upward, rearward, and outward in the width direction of the first cover 50. Referring to FIG. 6, the opening 58a extends from high to low obliquely in a downward direction at an angle D with respect to a horizontal plane. The term horizontal plane refers to a plane which is perpendicular to the mast 14. Specifically, the opening 58a is configured such that a line which passes through a point n1 that is located at the highest point in the opening 58a and a point n2 that is located at the lowest point in the opening 58a is slanted by the angle D with respect to the horizontal plane. In the present preferred embodiment, the angle D is preferably about 20 degrees, for example. It is preferable that the angle D is not smaller than about 5 degrees and not greater than about 45 degrees, for example. Referring to FIG. 2 through FIG. 4, each opening 58a (see FIG. 6) is fitted with a louver member 62.

Referring to FIG. 2, at least a portion of the attitude detector 40 and at least a portion of the opening 58a (see FIG. 13 to be described below) are located at a position which is higher than the frame 22 and more rearward than the mast 14. In the present preferred embodiment, the entire attitude detector 40 and the entire opening 58a are located at positions higher than the frame 22 and more rearward than the mast 14.

Referring to FIG. 6 through FIG. 8, each of the bulging portions 60 includes a triangular or substantially triangular opening 60a. The opening 60a is located at a lower position than the opening 58a. In the present preferred embodiment, each opening 60a opens downward, rearward, and outward in the width direction of the first cover 50.

Referring to FIG. 2, at least a portion of the attitude detector 40 and at least a portion of the opening 60a (see FIG. 13 to be described below) are located at positions which are higher than the frame 22 and more rearward than the mast 14. In the present preferred embodiment, the entire attitude detector 40 and the entire opening 60a are located at positions higher than the frame 22 and more rearward than the mast 14.

Referring to FIG. 7, the first cover 50 further includes openings 64, 66, 68, 70, 72, and a pair of openings 74. Referring to FIG. 5, FIG. 7, and FIG. 8, the opening 64 is defined by lower edges of the pair of side covers 54, opens downward, and extends in a fore-aft direction from the forward end portion 50a to the rearward end portion 50b.

Referring to FIG. 3, FIG. 5, and FIG. 7, the opening 66 is located in an upper end portion of the first cover 50, at its substantially intermediate portion in a plan view, and opens upward. The opening 66 is preferably circular or substantially circular in a plan view. The mast 14 (see FIGS. 1 and 2) penetrates the opening 66.

The opening 68 is located at a more forward position than the opening 66. The opening 68 is provided in an intermediate portion in the left-right direction of the first cover 50, and extends obliquely rearward and upward from the forward end portion 50a. The opening 68 is preferably rectangular or substantially rectangular in a plan view. Referring to FIG. 3 and FIG. 4, the opening 68 is fitted with the second cover 52. The second cover 52 will be described below.

Referring to FIG. 5, FIG. 7, and FIG. 8, the opening 70 is located at a more rearward position than the opening 66, whereas the opening 72 is located at a more rearward position than the opening 70. Each of the openings 70, 72 opens upward and is located at an intermediate portion in the left-right direction of the first cover 50. The opening 70 is preferably circular or substantially circular in a plan view, for example, whereas the opening 72 is preferably pentagonal or substantially pentagonal in a plan view, for example. The opening 70 is fitted with an upper end portion of the fuel tank 44 (see FIG. 2), whereas the opening 72 is fitted with the switch unit 42 (see FIG. 2).

Referring to FIG. 6 through FIG. 8, the pair of openings 74 are located on outer sides of the opening 66 and obliquely below thereof. Referring to FIG. 7 and FIG. 8, each of the openings 74 opens obliquely outward and upward. Referring to FIG. 2, each of the openings 74 communicates with the engine 32 via an air intake tube (not illustrated) and an air cleaner (not illustrated) which are placed inside the first cover 50. In other words, in the present preferred embodiment, the engine 32 takes in air from the pair of openings 74.

Figure 9:
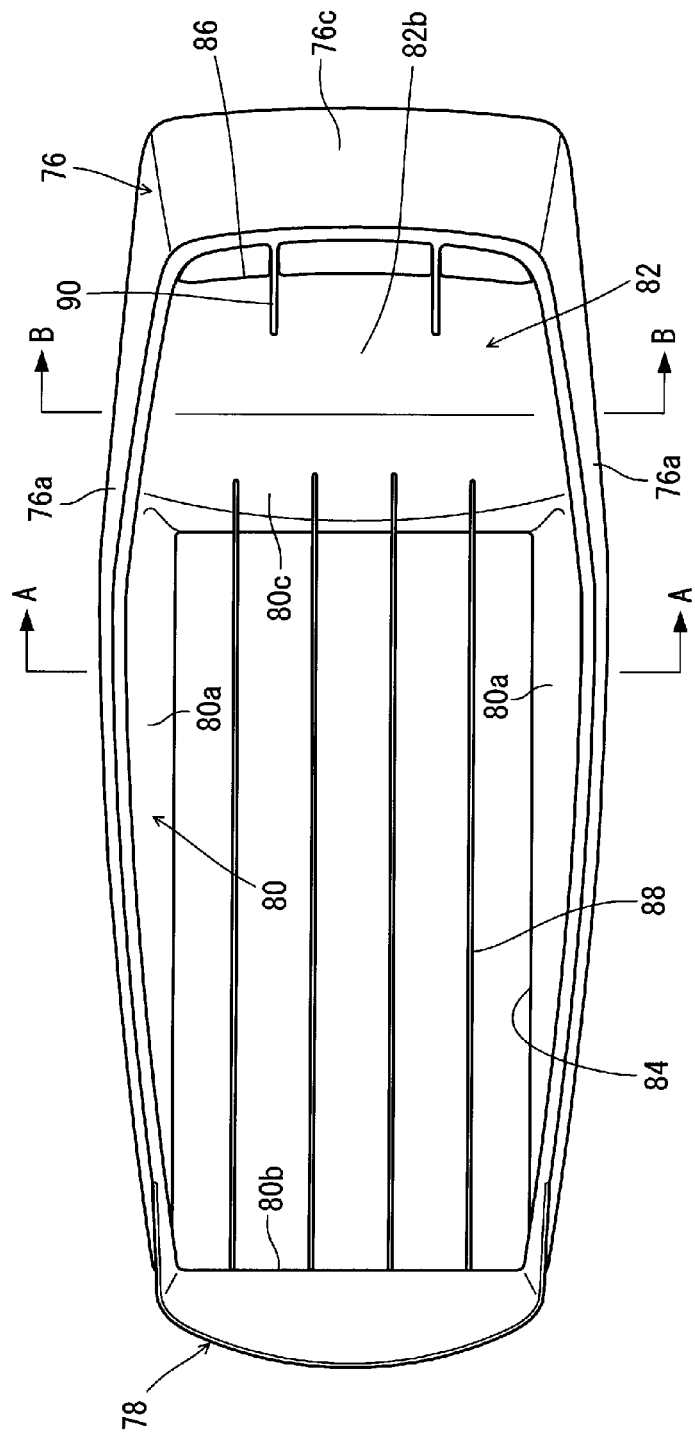
FIG. 9 is a plan view of a second cover.
Figure 10:
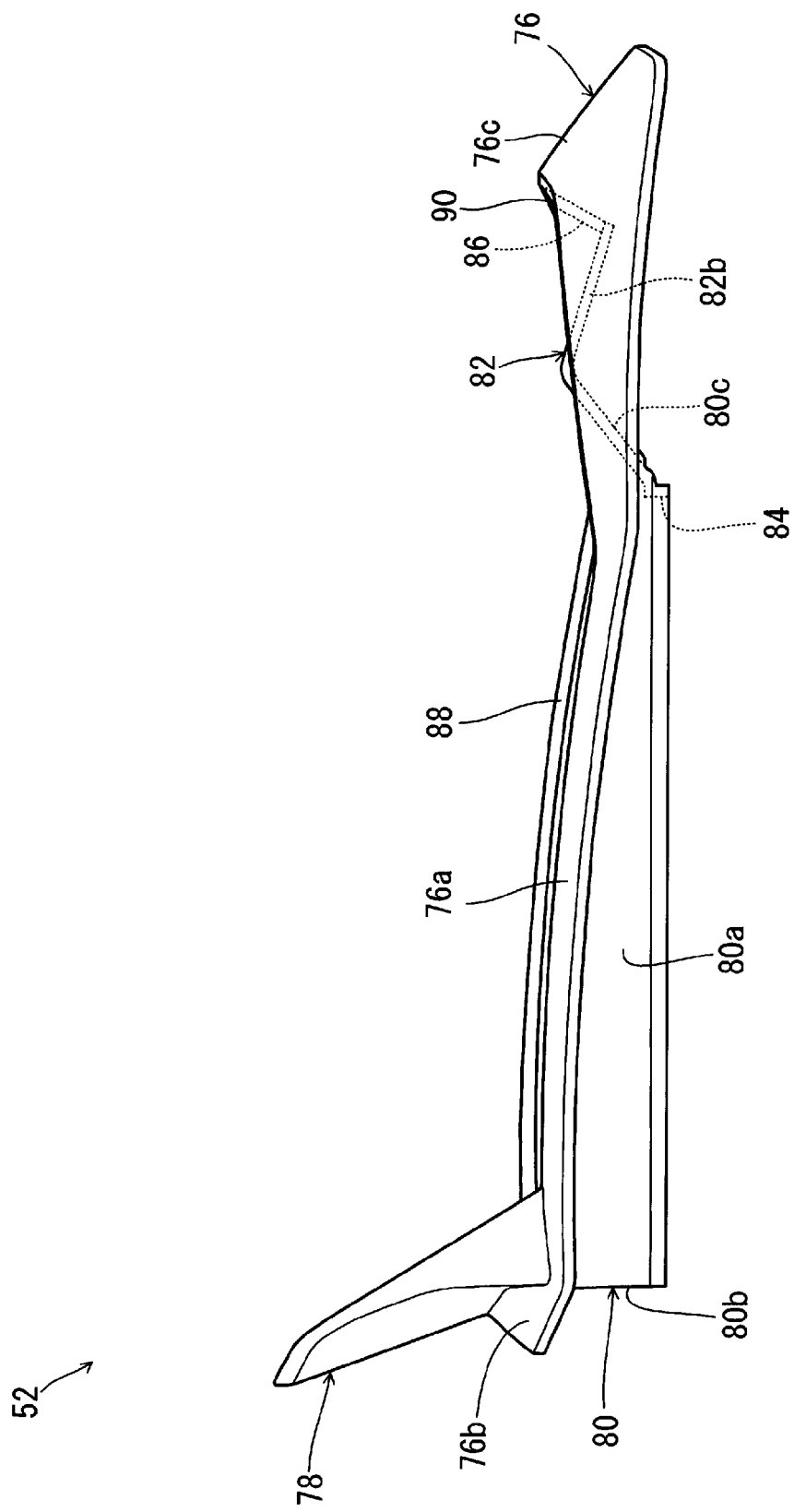
FIG. 10 is a side view of the second cover.
Figure 11:
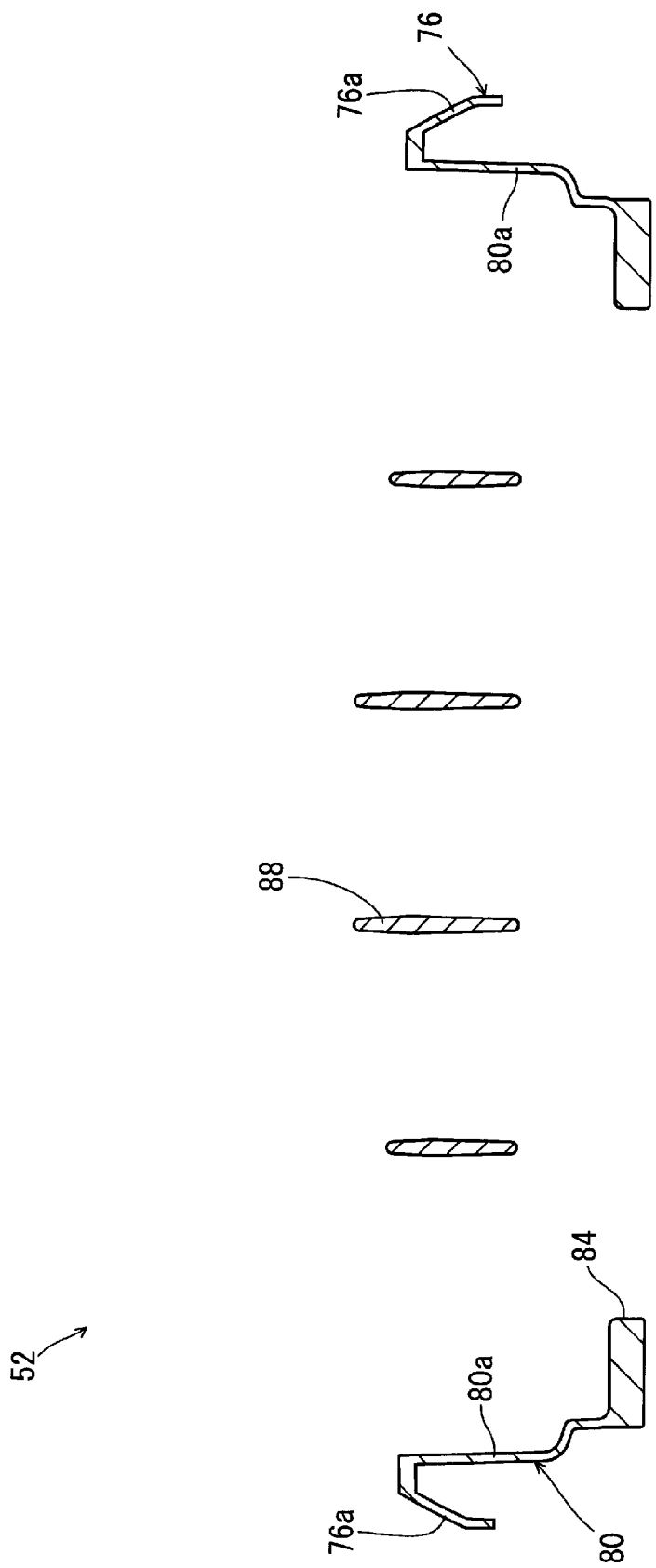
FIG. 11 is an end view taken along lines A-A in FIG. 9.
Figure 12:
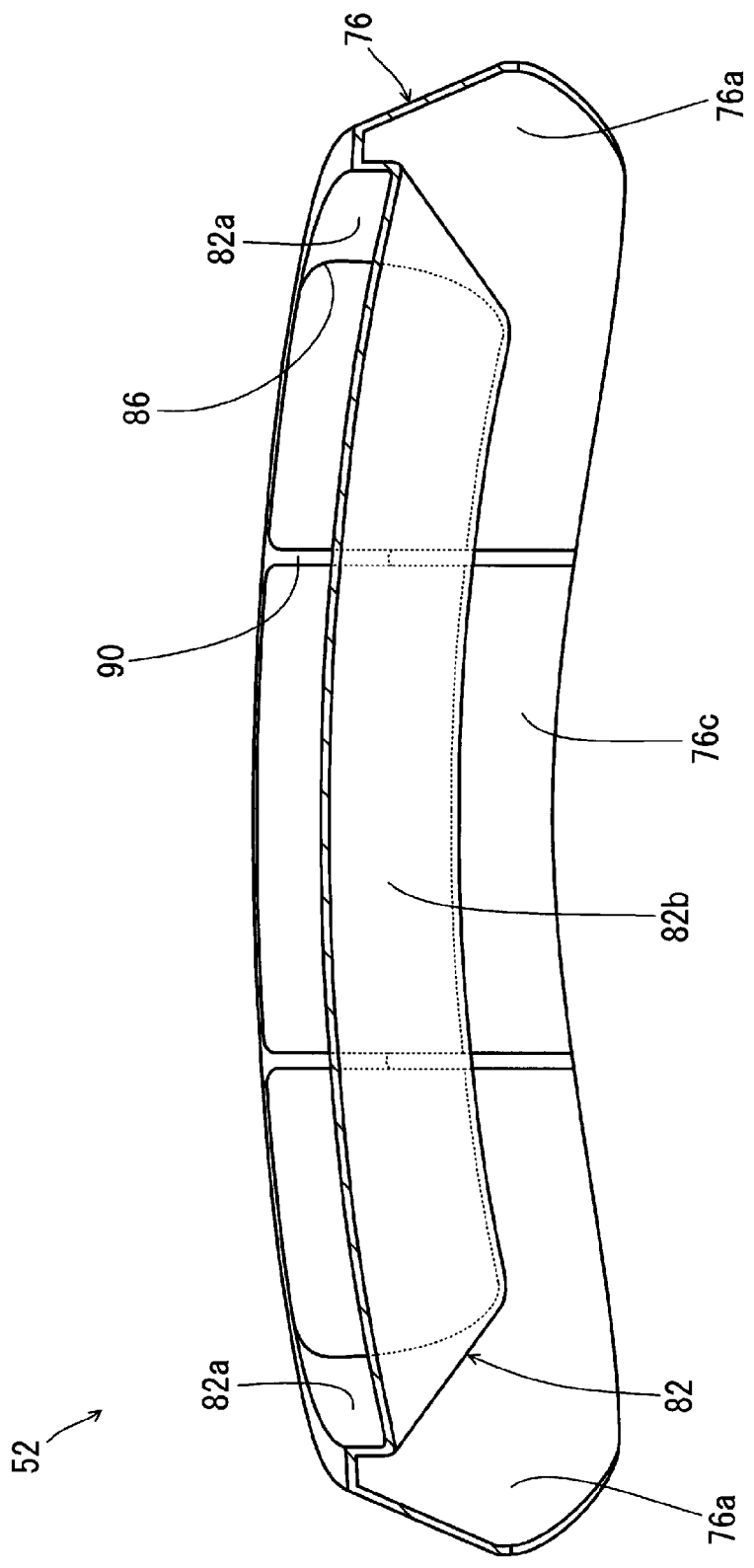
FIG. 12 is a sectional view taken along lines B-B in FIG. 9.

Next, the second cover 52 will be described. FIG. 9 is a plan view showing the second cover 52 (the second cover 52 viewed in Arrow X direction (see FIG. 1)), whereas FIG. 10 is a side view showing the second cover 52. Also, FIG. 11 is an end view taken along lines A-A in FIG. 9, whereas FIG. 12 is a sectional view taken along lines B-B in FIG. 9. FIG. 10 shows intermediate portions, in terms of the left-right direction, of a rear portion 80c (to be described below) and of a bottom portion 82b (to be described below) using broken lines.

Referring to FIG. 3, FIG. 4, and FIG. 9 through FIG. 12, the second cover 52 includes a frame shaped brim portion 76 and a plate shaped sail portion 78. The brim portion 76 extends obliquely from high to low while spreading outward of the second cover 52. The brim portion 76 includes a pair of side portions 76a extending in a fore-aft direction, a front portion 76b extending in a left-right direction to connect forward end regions of the pair of side portions 76a to each other, and a rear portion 76c extending in a left-right direction to connect rearward end regions of the pair of side portions 76a to each other. The sail portion 78 extends obliquely upward and forward from the front portion 76b and forward end regions of the pair of side portions 76a. The sail portion 78 is forwardly salient, and is U-shaped or substantially U-shaped in a plan view.

The second cover 52 further includes a tube shaped portion 80 extending to a lower position than the brim portion 76 inside of the brim portion 76, and a partitioning portion 82 which is U-shaped or substantially U-shaped in a front view and extends to a more rearward position than the tube shaped portion 80. The tube shaped portion 80 includes a pair of side portions 80a extending in a fore-aft direction, a front portion 80b extending in a left-right direction to connect forward end regions of the pair of side portions 80a to each other, and a rear portion 80c extending in a left-right direction to connect rearward end regions of the pair of side portions 80a to each other. The partitioning portion 82 includes a pair of side portions 82a extending in a fore-aft direction, and a bottom portion 82b extending in a left-right direction to connect lower end regions of the pair of side portions 82a to each other.

The pair of side portions 80a and the pair of side portions 82a have their upper edges connected to upper edges of the pair of side portions 76a. The pair of side portions 80a have their rearward end regions connected to forward end regions of the pair of side portions 82a. The front portion 80b has its upper edge connected to a lower edge of the sail portion 78. The rear portion 80c has its upper edge connected to a front edge of the bottom portion 82b. The rear portion 80c extends obliquely forward and downward from the front edge of the bottom portion 82b. Referring to FIG. 10 and FIG. 11, the pair of side portions 80a and the rear portion 80c have their lower end portions extending toward inside of the second cover 52.

Referring to FIG. 3, FIG. 4, and FIG. 9 through FIG. 12, a lower end portion of the tube shaped portion 80 defines an opening 84, whereas a front edge of the rear portion 76c and a rear edge of the partitioning portion 82 define an opening 86. The opening 84 is preferably rectangular or substantially rectangular, for example, and extends in a fore-aft direction in a plan view, whereas the opening 86 is preferably rectangular or substantially rectangular, for example, and extends in a left-right direction in a front view.

A plurality (for example, four, in the present preferred embodiment) of ribs 88 partition the opening 84 into a plurality (for example, five, in the present preferred embodiment) of regions in a plan view. Each of the ribs 88 extends in a fore-aft direction to connect the front portion 80b and the rear portion 80c of the tube shaped portion 80 to each other. A plurality (for example, two, in the present preferred embodiment) of ribs 90 partition the opening 86 into a plurality (for example, three, in the present preferred embodiment) of regions in a front view. Each of the ribs 90 extends in an up-down direction and in a fore-aft direction to connect the rear portion 76c of the brim portion 76 and the bottom portion 82b of the partitioning portion 82 to each other.

Referring to FIG. 2, in the present preferred embodiment, the tube shaped portion 80 of the second cover 52 is inserted into the opening 68 of the first cover 50. The tube shaped portion 80 is fixed to an upper surface of the radiator 34 with unillustrated fasteners (e.g., bolts and nuts, etc.). Thus, the second cover 52 is fixed to the radiator 34.

Figure 13:
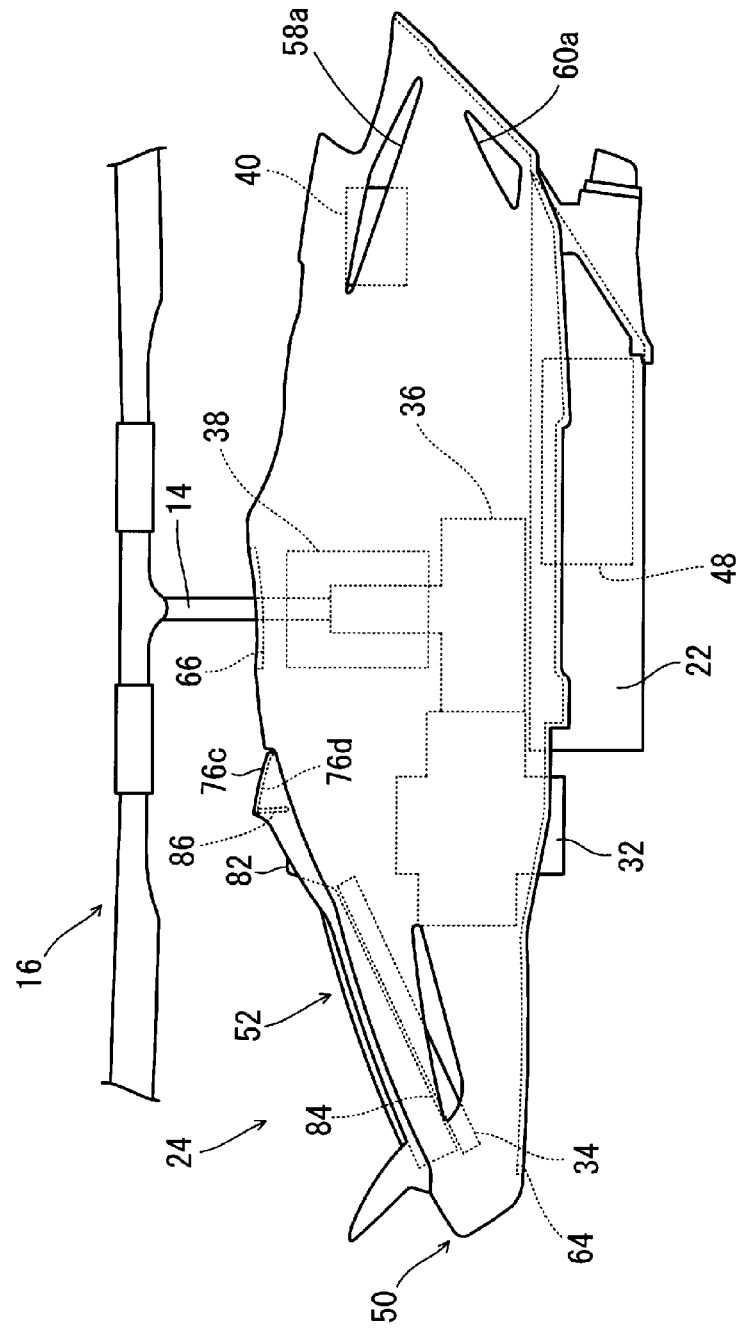
FIG. 13 is a side view showing a primary portion of the helicopter.

FIG. 13 is a side view showing a primary portion of the helicopter 10. Note that FIG. 13 does not show any of the tail body 18, the tail rotor 20, the pair of leg portions 26, the pair of leg portions 28, the pair of skids 30, the switch unit 42, the fuel tank 44, and the rotating shaft 46, and shows the body cover 24 in a simplified manner. The same will apply to FIG. 14 through FIG. 17 and FIG. 19 through FIG. 23 which will be described below.

Referring to FIG. 13, when the second cover 52 is fixed to the radiator 34, the opening 84 faces obliquely forward and upward, whereas the opening 86 faces forward but slightly downward. Referring to FIG. 4, in the present preferred embodiment, when the second cover 52 is fixed to the radiator 34, the opening 86 is not visible in a plan view of the helicopter 10. In other words, the second cover 52 is fixed to the radiator 34 such that the opening 86 is hidden by the rear portion 76c in a plan view of the helicopter 10. This configuration makes it less likely that rain water will enter from the opening 86 into the body cover 24 even if the helicopter 10 is being used in a rain.

Referring to FIG. 13, since the second cover 52 is fixed to the radiator 34 as described above, the opening 84 is provided in the body cover 24 at a more forward position than the opening 66, and the opening 86 is located at a position which is more forward than the opening 66 and more rearward than the opening 84 and the radiator 34. The opening 86 is located at a higher position than the opening 84 and the radiator 34. In other words, the opening 86 is between the opening 66 and the opening 84. Also, the opening 86 is above the engine 32. The rear portion 76c of the second cover 52 is located at a more rearward and higher position than the opening 84 and extends from low to high toward a position which is obliquely forward and upward of the body cover 24. In the present preferred embodiment, the rear portion 76c extends obliquely rearward and downward from an upper end portion of the opening 86. The rear portion 76c has its upper end located at a higher position than an upper end of the sail portion 78. Therefore, a lower surface 76d of the rear portion 76c is visible in a front view of the helicopter 10.

In the present preferred embodiment, the opening 66 corresponds to the first air vent portion, the opening 84 corresponds to the second air vent portion, the opening 86 corresponds to the third air vent portion, the pair of openings 58a and the pair of openings 60a correspond to the fourth air vent portion, and the rear portion 76c corresponds to the guide portion.

Figure 14:
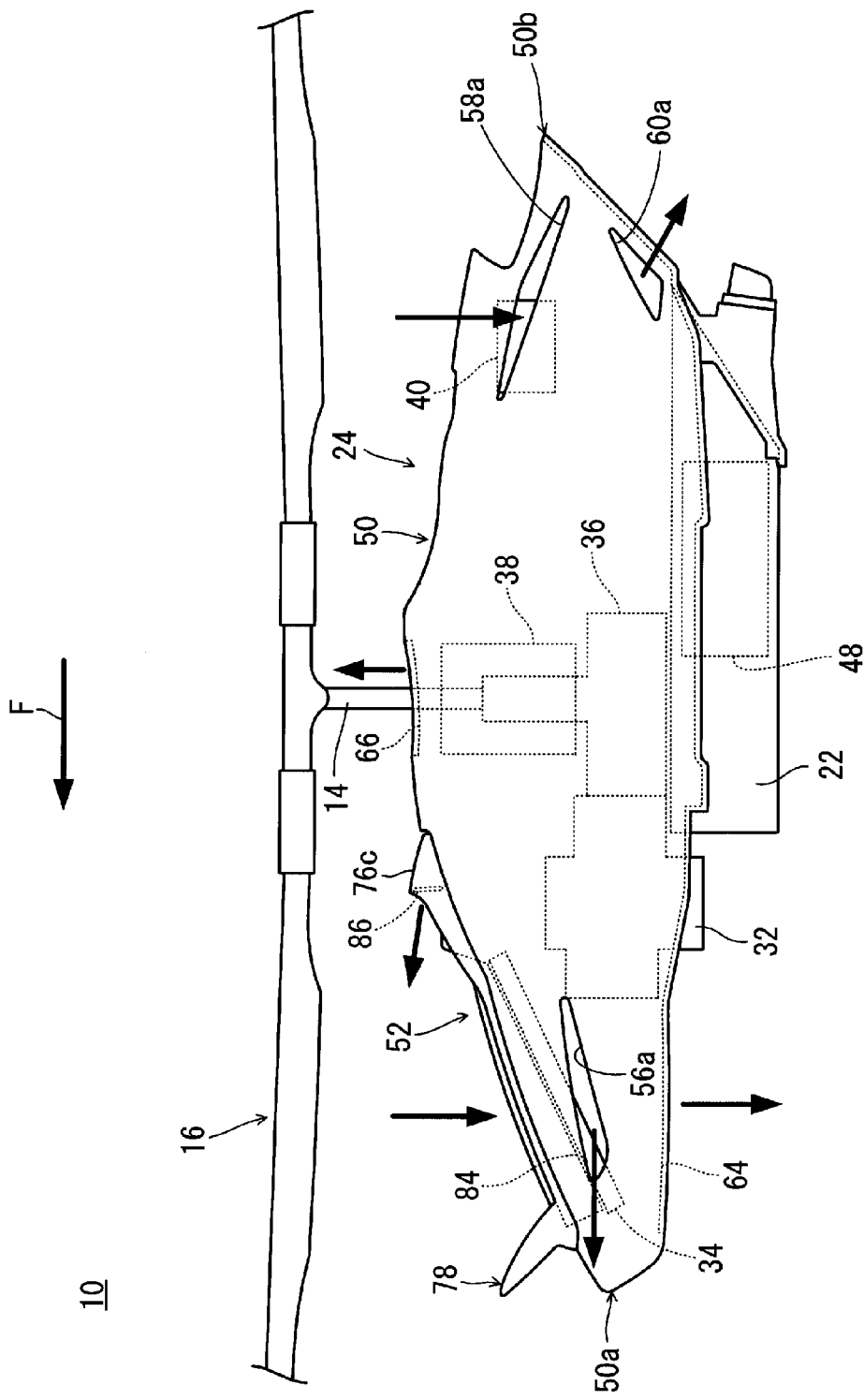
FIG. 14 is a side view showing a state of a primary portion of the helicopter during hovering.

Next, reference will be made to FIG. 14 through FIG. 16 to describe briefly how air flows through the body cover 24 in three cases, i.e., when the helicopter 10 is hovering, flying forward, and flying backward. FIG. 14 is a side view showing a state of a primary portion of the helicopter 10 while it is hovering, FIG. 15 is a side view showing a state of a primary portion of the helicopter 10 while it is flying forward, and FIG. 16 is a side view showing a state of a primary portion of the helicopter 10 while it is flying backward.

Referring to FIG. 14, when the helicopter 10 is hovering, downwash from the main rotor 16 flows toward the opening 84 directly or along the sail portion 78 at a more forward position than the mast 14. Also, at a more rearward position than the mast 14, downwash from the main rotor 16 flows toward the pair of openings 58a. The downwash from the main rotor 16 passes through the opening 84 and the radiator 34 and flows into the body cover 24 while also passing through the pair of openings 58a and flowing into the body cover 24. As the air flows into the body cover 24 from the openings 58a, 84, air inside the body cover 24 is discharged from the pair of openings 56a, the opening 64, the opening 66, the opening 86, and the pair of openings 60a to an outside of the body cover 24. Particularly, rotation of the main rotor 16 generates an updraft around the mast 14 such that the air inside the body cover 24 is discharged efficiently out of the body cover 24 via the opening 66.

Figure 15:
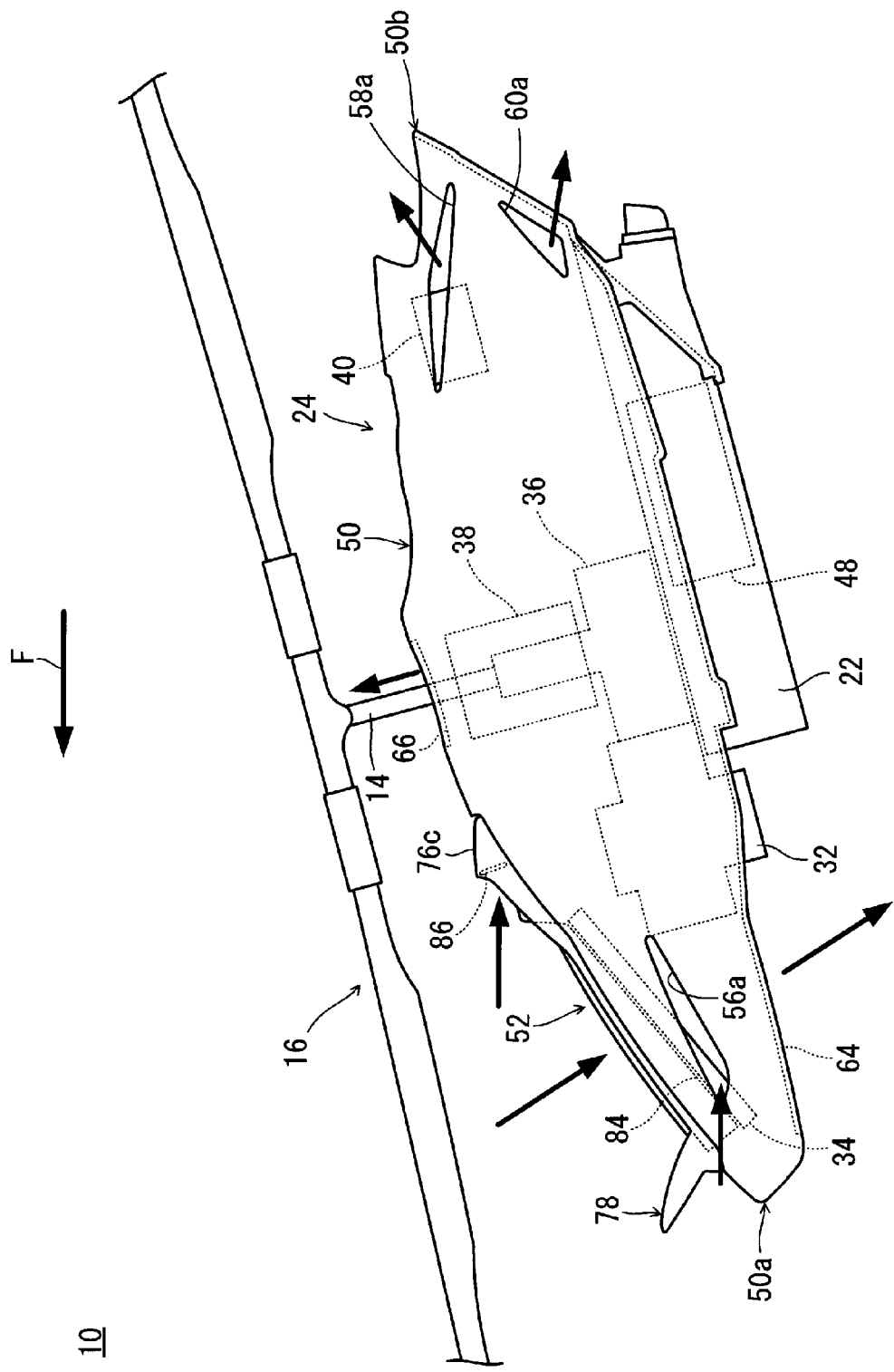
FIG. 15 is a side view showing a state of a primary portion of the helicopter during forward flight.

Referring to FIG. 15, when the helicopter 10 is flying forward, downwash from the main rotor 16 passes through the opening 84 and the radiator 34 into the body cover 24. Also, air from the direction in which the helicopter 10 flies (air from ahead) passes through the pair of openings 56a and the opening 86 and flows into the body cover 24. As the air flows into the body cover 24 from the openings 56a, 84, and 86, air inside the body cover 24 is discharged from the opening 64, the opening 66, the pair of openings 58a, and the pair of openings 60a to an outside of the body cover 24. Also, as an updraft is generated around the mast 14, air inside the body cover 24 is discharged efficiently out of the body cover 24 via the opening 66.

Figure 16:
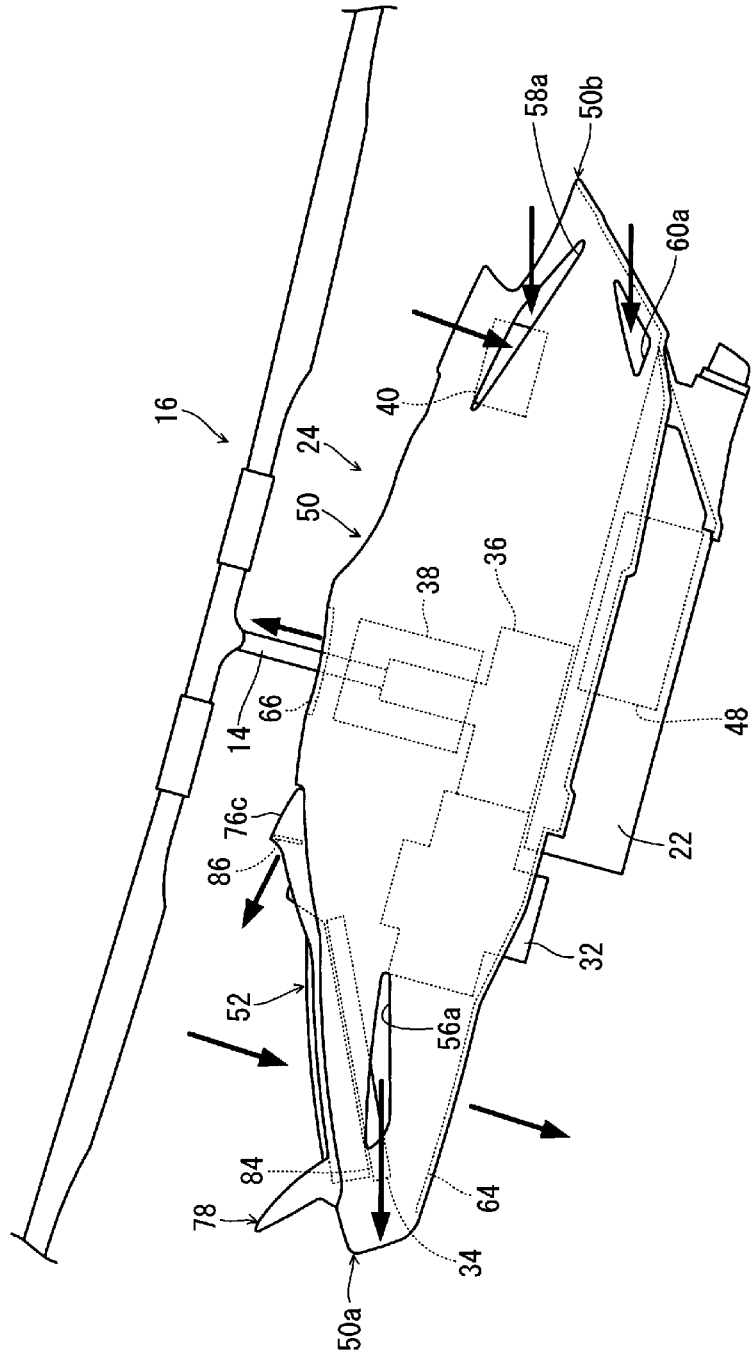
FIG. 16 is a side view showing a state of a primary portion of the helicopter during backward flight.

Referring to FIG. 16, when the helicopter 10 is flying backward, downwash from the main rotor 16 passes through the opening 84 and the radiator 34 similarly to that when hovering, and flows into the body cover 24 while also passing through the pair of openings 58a and flowing into the body cover 24. Also, air from the direction in which the helicopter 10 flies (air from the rear) passes through the pair of openings 58a and the pair of openings 60a and flows into the body cover 24. As the air flows into the body cover 24 from the openings 58a, 60a, and 84, air inside the body cover 24 is discharged from the pair of openings 56a, the opening 64, the opening 66, and the opening 86 to an outside of the body cover 24. Also, as an updraft is generated around the mast 14, air inside the body cover 24 is discharged efficiently out of the body cover 24 via the opening 66.

As described above, it is possible to replace air inside the body cover 24 smoothly in whichever of the cases, i.e., hovering, forward flying, and backward flying.

Hereinafter, description will be made of the functions and advantages of the helicopter 10.

The body cover 24 of the helicopter 10 includes the opening 66 penetrated by the mast 14, the opening 84 which is located at a more forward position than the opening 66 to introduce air to the radiator 34, and the opening 86 which is located at a position more forward than the opening 66 and more rearward than the radiator 34. The opening 86 is located at a higher position than the opening 84 and the radiator 34.

Due to the arrangement described above, air flows into the body cover 24 from the opening 84 while air inside the body cover 24 is discharged out of the body cover 24 from the openings 66, 86 during hovering. While the helicopter 10 is flying forward, air flows into the body cover 24 from the openings 84, 86 while air inside the body cover 24 is discharged out of the body cover 24 from the opening 66. While the helicopter 10 is flying backward, air inside the body cover 24 is discharged from the opening 66 and the opening 86 to an outside of the body cover 24. As described above, it is possible to efficiently replace air inside the body cover 24 with the opening 66, the opening 84, and the opening 86. Thus, it is possible to significantly reduce or prevent a temperature increase inside the body cover 24 without utilizing a plurality of radiators. In other words, it is possible to significantly reduce or prevent a temperature increase inside the body cover 24 while significantly reducing or preventing an increase in the weight of the helicopter 10.

In the helicopter 10, the opening 66, the opening 84, and the opening 86 are preferably independent from each other. In this case, it is possible to design the opening 66, the opening 84, and the opening 86 appropriately without any of them being affected by the others. Therefore, it is possible to configure the openings 84, 86 so that the flows of air introduced from the openings 84, 86 into the body cover 24 have specific directions. This makes it possible to significantly reduce or prevent a temperature increase inside the body cover 24 more efficiently.

The rear portion 76c of the brim portion 76 in the second cover 52 is located at a more rearward and higher position than the opening 84 and extends from low to high toward a position that is obliquely forward and upward of the body cover 24 so that the lower surface 76d is visible in a front view. In this case, it is possible to efficiently introduce air from ahead of the helicopter 10 into the body cover 24 by the rear portion 76c. Also, it is possible to introduce air into the body cover 24 with a simple arrangement.

In the helicopter 10, the opening 86 is above the engine. Due to this arrangement, air around the engine 32 inside the body cover 24 is discharged more positively from the opening 86 to an outside of the body cover 24 at times of hovering and backward flying. This makes it possible to significantly reduce or prevent a temperature increase inside the body cover 24.

In the helicopter 10, the pair of openings 58a and the pair of openings 60a are provided at a more rearward position than the opening 66. In this case, air inside the body cover 24 is discharged also from the pair of openings 58a and the pair of openings 60a when the helicopter 10 is flying forward. This makes it possible to replace air inside the body cover 24 more efficiently. Also, when the helicopter 10 is flying backward, it is possible to introduce air into the body cover 24 from the pair of openings 58a and the pair of openings 60a. Thus, it is also possible to significantly reduce or prevent a temperature increase inside the body cover 24 when the helicopter 10 is flying backward.

In the helicopter 10, at least a portion of the pair of openings 58a and the pair of openings 60a is located at a position which is higher than the frame 22 and more rearward than the mast 14. In this case, air that is introduced from the opening 84 and the opening 86 to the pair of openings 58a and the pair of openings 60a, or air that is introduced from the pair of openings 58a and the pair of openings 60a to the opening 66 and the opening 86 are more likely to pass above the frame 22. In the helicopter 10, at least a portion of the attitude detector 40 is also located at a position which is higher than the frame 22 and more rearward than the mast 14. Therefore, it is possible to efficiently cool the attitude detector 40 with the air that is introduced from the opening 84 and the opening 86 to the pair of openings 58a and the pair of openings 60a, or the air that is introduced from the pair of openings 58a and the pair of openings 60a to the opening 66 and the opening 86.

It should be noted here that in the second cover 52 described above, it is not necessary to include a plurality of ribs 88, or it is not necessary to include a plurality of ribs 90.

Figure 17:
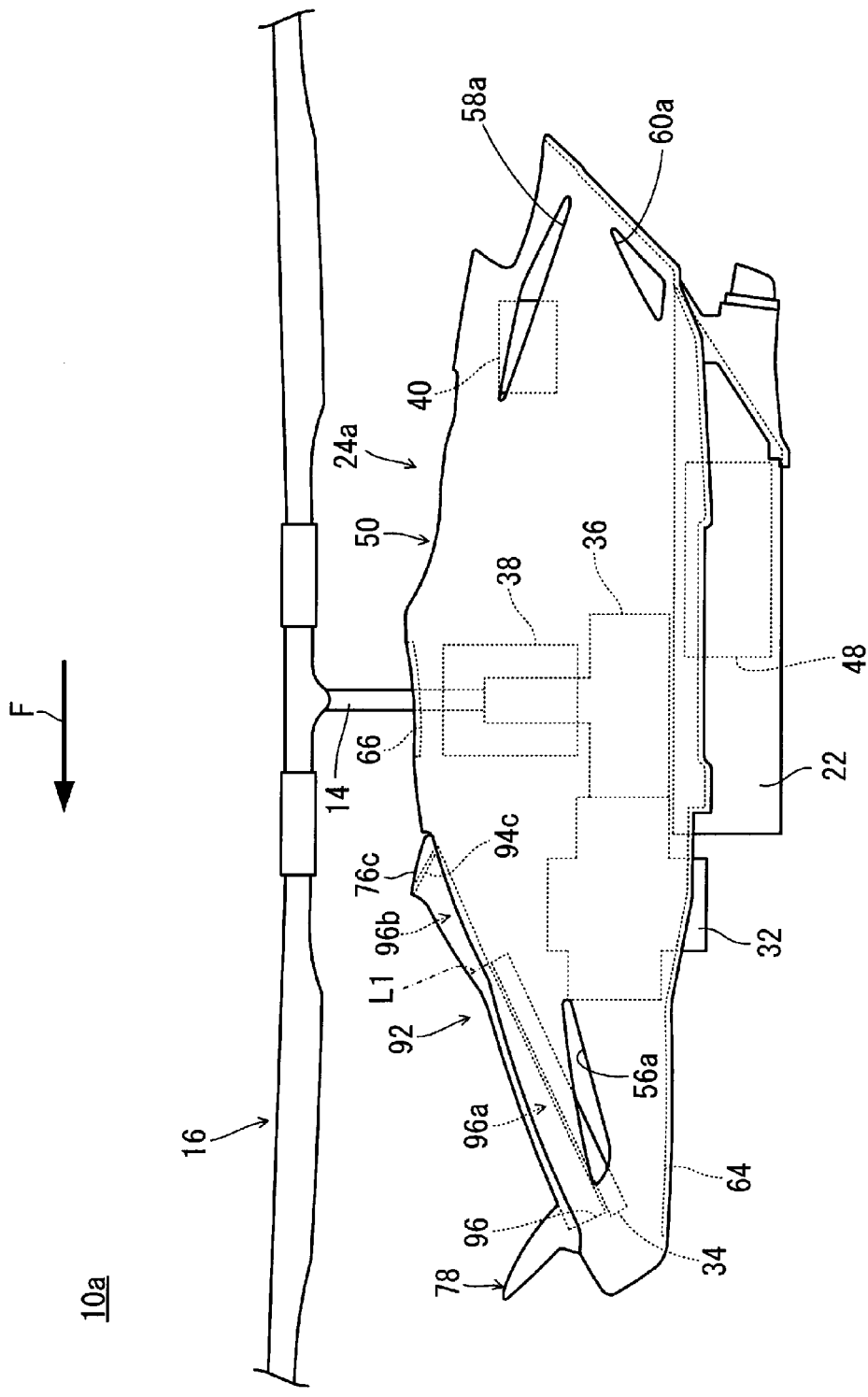
FIG. 17 is a side view showing a primary portion of a helicopter according to another preferred embodiment of the present invention.

FIG. 17 is a side view showing a primary portion of a helicopter 10a according to another preferred embodiment of the present invention. Hereinafter, description will be made only for those elements in the helicopter 10a which differ from the helicopter 10. The configurations which are the same as those in the helicopter 10 will not be described.

Referring to FIG. 17, the helicopter 10a differs from the above-described helicopter 10 in that it includes a body cover 24a instead of the body cover 24. The body cover 24a differs from the body cover 24 in that it includes a second cover 92 instead of the second cover 52.

Figure 18:
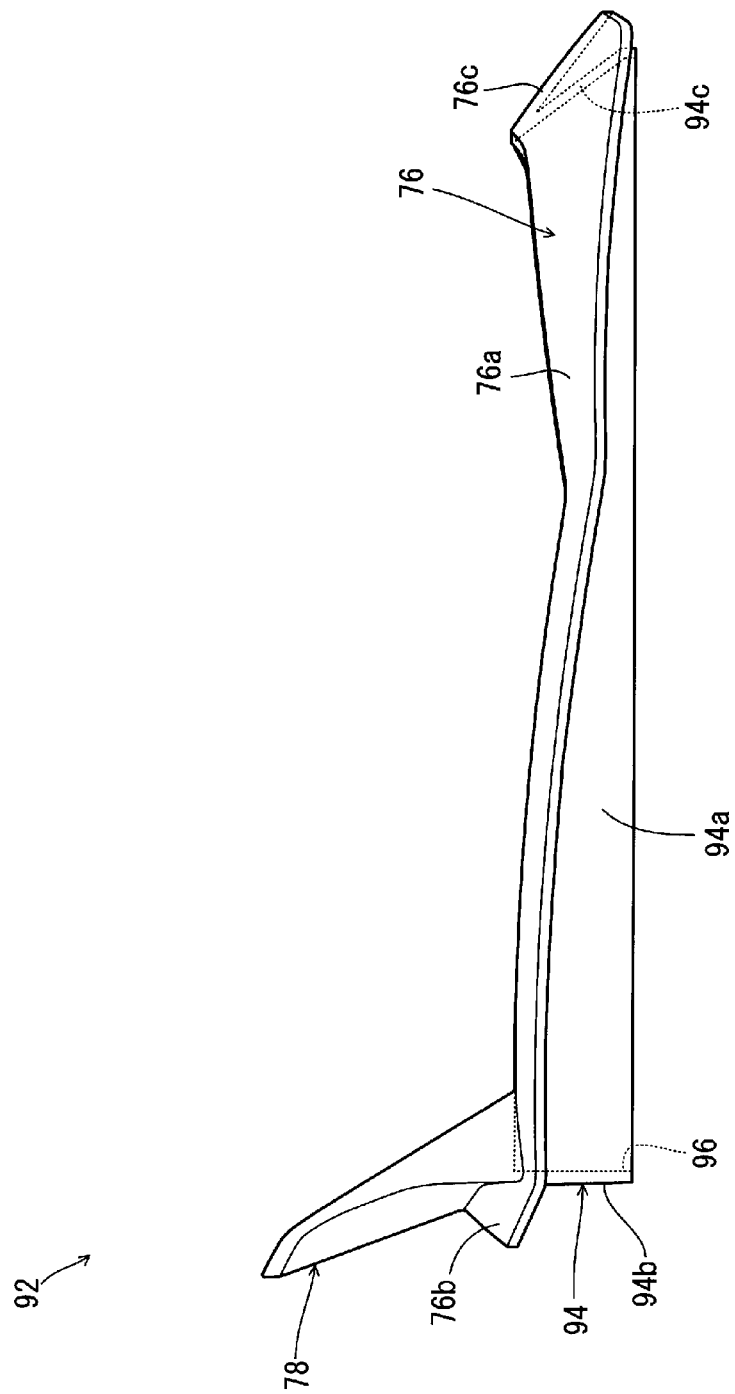
FIG. 18 is a side view showing a second cover of the helicopter according to the another preferred embodiment of the present invention.

FIG. 18 is a side view of the second cover 92. Referring to FIG. 18, the second cover 92 differs from the second cover 52 in that it does not include the partitioning portion 82 (see FIG. 9), a plurality of the ribs 88 (see FIG. 9) or a plurality of ribs 90 (see FIG. 9), and in that it includes a tube shaped portion 94 instead of the tube shaped portion 80 (see FIGS. 9, 10).

The tube shaped portion 94 extends inside the brim portion 76 to a lower position than the brim portion 76. The tube shaped portion 94 includes a pair of side portions 94a (FIG. 18 shows only one of the side portions 94a) extending in a fore-aft direction, a front portion 94b extending in a left-right direction to connect forward end regions of the pair of side portions 94a to each other, and a rear portion 94c extending in a left-right direction to connect rearward end regions of the pair of side portions 94a to each other. The pair of side portions 94a have their upper edges connected to the upper edges of the pair of side portions 76a. The front portion 94b has its upper edge connected to the lower edge of the sail portion 78. The rear portion 94c has its upper edge connected to an upper edge of the rear portion 76c. The rear portion 94c extends obliquely rearward and downward from the upper edge of the rear portion 76c. In the second cover 92, an opening 96 is defined by an inner surface of the tube shaped portion 94.

Referring to FIG. 17, the second cover 92 is fixed to the radiator 34 so that the opening 96 faces obliquely forward and upward. In the present preferred embodiment, the tube shaped portion 94 (see FIG. 18) is fixed to an upper surface of the radiator 34 with unillustrated fasteners (e.g., bolts and nuts, etc.).

In the helicopter 10a, a region 96a of the opening 96 which is located at a more forward position than the opening 66 and facing the radiator 34 (a portion which is more forward than an alternate long and short dash line L1) functions the same way as the opening 84 (see FIG. 13 through FIG. 16) of the second cover 52 (see FIG. 13 through FIG. 16). Also, a region 96b of the opening 96 which is located more forward than the opening 66 and higher than the region 96a and the radiator 34 in an area more rearward than the radiator 34 (a portion which is more rearward than the alternate long and short dash line L1) functions the same way as the opening 86 (see FIG. 13 through FIG. 16) of the second cover 52 (see FIG. 13 through FIG. 16). Further, the rear portion 94c, which is located at a more rearward and higher position than the region 96a, and extends from low to high toward a point which is obliquely forward and upward of the body cover 24a, functions the same way as the rear portion 76c (see FIG. 13 through FIG. 16) of the body cover 24 (see FIG. 13 through FIG. 16). In other words, in the present preferred embodiment, the region 96a corresponds to the second air vent portion, the region 96b corresponds to the third air vent portion, and the rear portion 94c corresponds to the guide portion. In the present preferred embodiment, the rear portion 94c extends obliquely rearward and downward from a rearward end portion of an upper edge of the opening 96 (the region 96b).

As described above, in the helicopter 10a, the region 96a functions the same way as the opening 84 of the helicopter 10, the region 96b functions the same way as the opening 86 of the helicopter 10, and the rear portion 94c functions the same way as the rear portion 76c of the helicopter 10. Therefore, the helicopter 10a provides the same functions and advantages as offered by the helicopter 10.

According to the helicopter 10a, a single opening 96 in the second cover 92 includes the region 96a as the second air vent portion, and the region 96b as the third air vent portion. This makes it easy to manufacture the second cover 92 and to manufacture the body cover 24a.

It should be noted here that in the second cover 92, there may be provided a plurality of ribs extending in a fore-aft direction to connect the front portion 94b and the rear portion 94c to each other.

Figure 19:
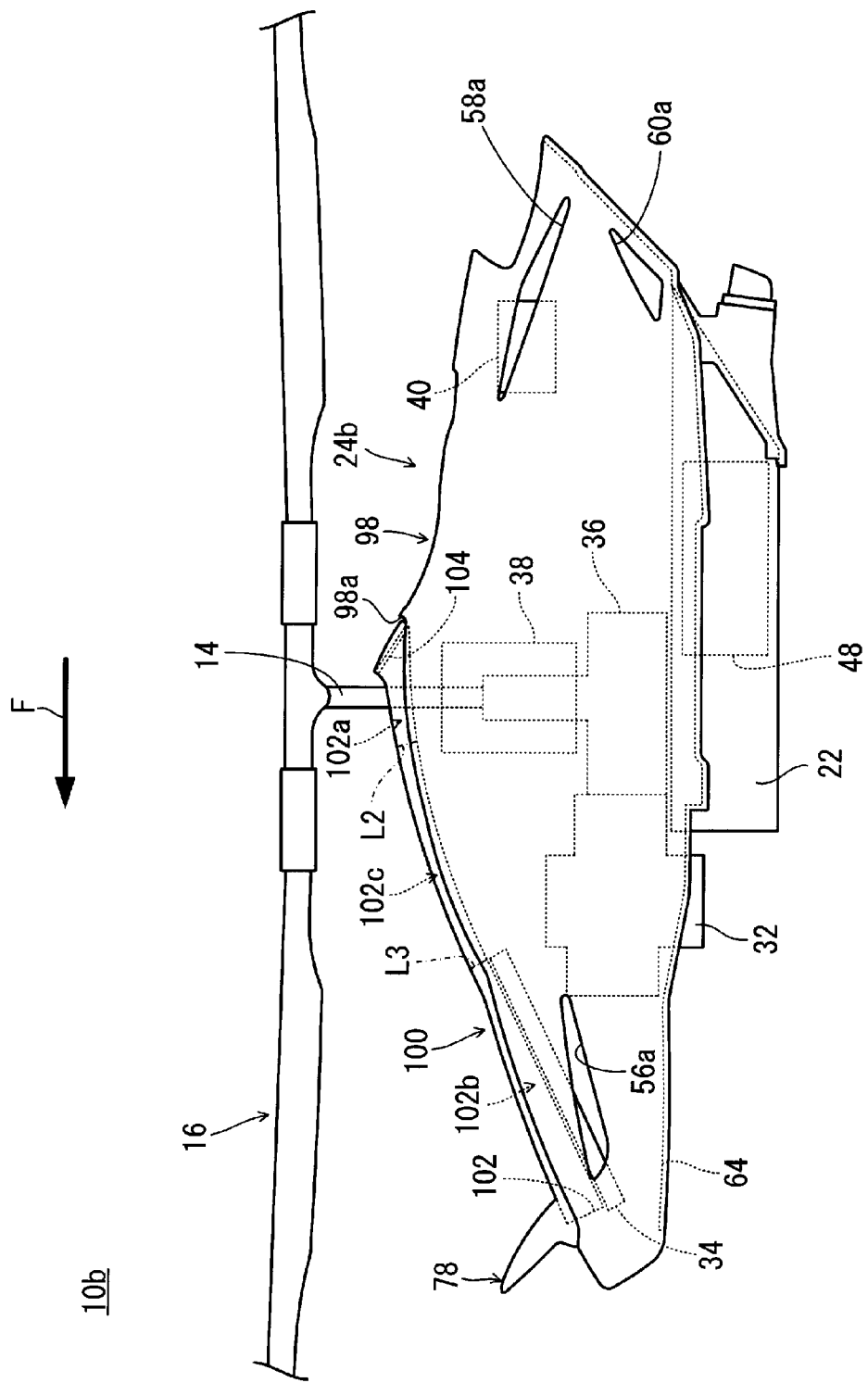
FIG. 19 is a side view showing a primary portion of a helicopter according to still another preferred embodiment of the present invention.

FIG. 19 is a side view showing a primary portion of a helicopter 10b according to still another preferred embodiment of the present invention. Hereinafter, description will be made only for those elements in the helicopter 10b which differ from the helicopter 10. The configurations which are the same as those in the helicopter 10 will not be described.

Referring to FIG. 19, the helicopter 10b differs from the above-described helicopter 10 in that it includes a body cover 24b instead of the body cover 24. The body cover 24b differs from the body cover 24 in that it includes a first cover 98 instead of the first cover 50, and a second cover 100 instead of the second cover 52.

The first cover 98 differs from the first cover 50 in that it includes an opening 98a instead of the opening 66 (see FIG. 7) and the opening 68 (see FIG. 7). The opening 98a extends obliquely downward from a more rearward position than the mast 14 toward a forward end portion of the first cover 98. The opening 98a is fitted with the second cover 100.

The second cover 100 has a shape resembling the above-described second cover 92 (see FIG. 17, 18) elongated in a fore-aft direction, and includes an opening 102. The opening 102 has a shape resembling the above-described opening 96 (see FIG. 17, 18) of the second cover 92 elongated in a fore-aft direction. The second cover 100 includes a rear portion 104 which has the same configuration as the above-described rear portion 94c of the second cover 92. The second cover 100 is fixed to the radiator 34 so that the opening 102 faces obliquely forward and upward. In the present preferred embodiment, the mast 14 penetrates the opening 102.

In the helicopter 10b, a region 102a of the opening 102 around the mast 14 (a region more rearward than an alternate long and short dash line L2) functions the same way as the opening 66 (see FIG. 13 through FIG. 16) of the first cover 50 (see FIG. 13 through FIG. 16). A region 102b of the opening 102, which is located more forward than the region 102a and facing the radiator 34 (a region which is more forward than an alternate long and short dash line L3) functions the same way as the opening 84 (see FIG. 13 through FIG. 16) of the second cover 52 (see FIG. 13 through FIG. 16). A region 102c of the opening 102, which is provided at a higher location than the region 102b and the radiator 34 in an area which is more forward than the region 102a and more rearward than the radiator 34 (a region which is more forward than the alternate long and short dash line L2 but more rearward than the alternate long and short dash line L3) functions the same way as the opening 86 (see FIG. 13 through FIG. 16) of the second cover 52 (see FIG. 13 through FIG. 16). Further, the rear portion 104, which is located at a more rearward and higher position than the region 102a, and extends from low to high toward a point which is obliquely forward and upward of the body cover 24b, functions the same way as the rear portion 76c (see FIG. 13 through FIG. 16) of the body cover 24 (see FIG. 13 through FIG. 16). In other words, in the present preferred embodiment, the region 102a corresponds to the first air vent portion, the region 102b corresponds to the second air vent portion, the region 102c corresponds to the third air vent portion, and the rear portion 104 corresponds to the guide portion. In the present preferred embodiment, the rear portion 104 extends obliquely rearward and downward from a rearward end portion of an upper edge of the opening 102 (region 102a).

As described above, in the helicopter 10b, the region 102a functions the same way as the opening 66 of the helicopter 10, the region 102b functions the same way as the opening 84 of the helicopter 10, the region 102c functions the same way as the opening 86 of the helicopter 10, and the rear portion 104 functions the same way as the rear portion 76c of the helicopter 10. Therefore, the helicopter 10b provides the same functions and advantages as offered by the helicopter 10.

Also, in the helicopter 10b, a single opening 102 in the second cover 100 includes the region 102a as the first air vent portion, the region 102b as the second air vent portion, and the region 102c as the third air vent portion, making it easy to manufacture the body cover 24b.

It should be noted here that again in the second cover 100, a plurality of ribs extending in a fore-aft direction may be provided.

Figure 20:
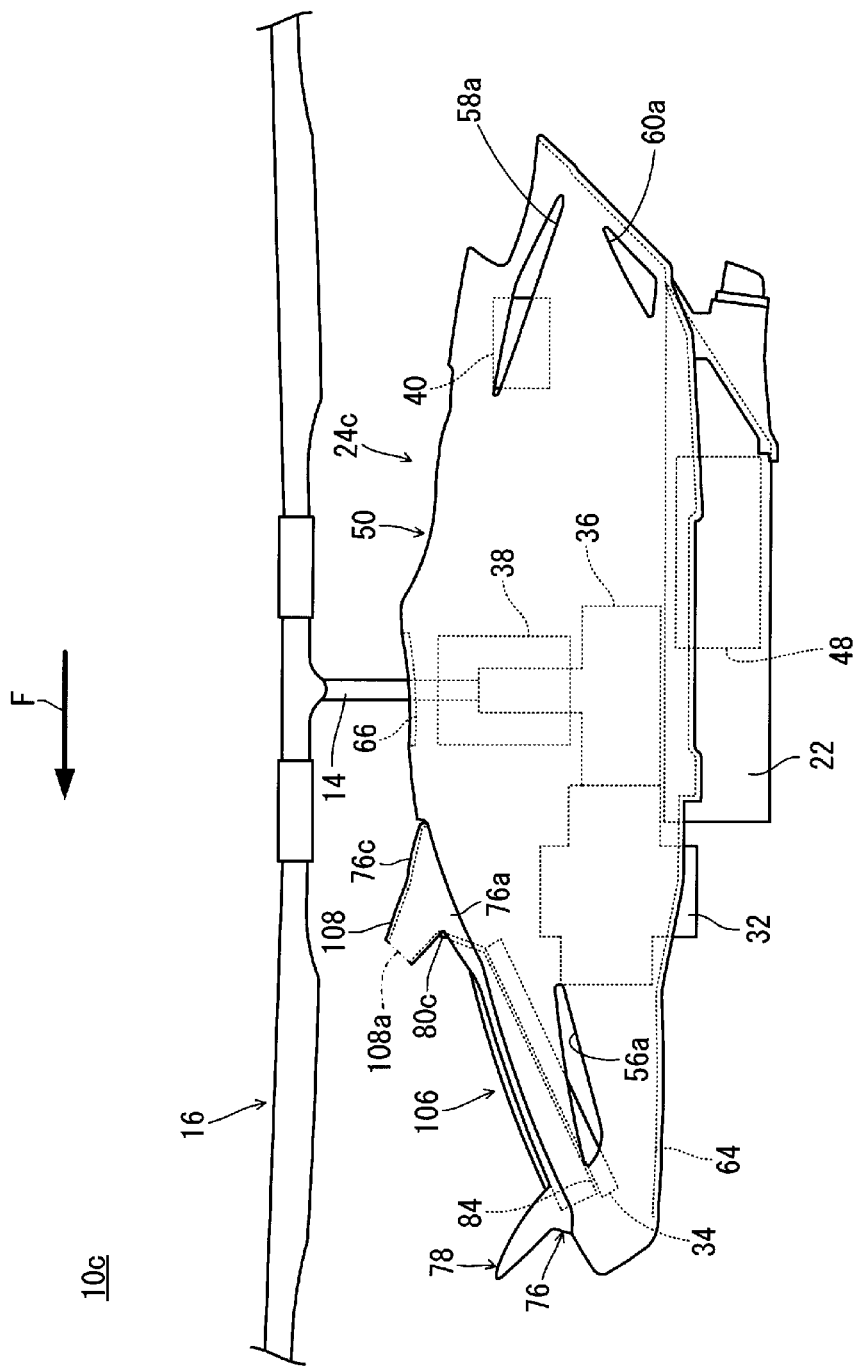
FIG. 20 is a side view showing a primary portion of a helicopter according to still another preferred embodiment of the present invention.

FIG. 20 is a side view showing a primary portion of a helicopter 10c according to still another preferred embodiment of the present invention. Hereinafter, description will be made only for those elements in the helicopter 10c which differ from the helicopter 10. The configurations which are the same as those in the helicopter 10 will not be described.

Referring to FIG. 20, the helicopter 10c differs from the above-described helicopter 10 in that it includes a body cover 24c instead of the body cover 24. The body cover 24c differs from the body cover 24 in that it includes a second cover 106 instead of the second cover 52.

The second cover 106 differs from the second cover 52 in that it includes a first tube shaped portion 108 instead of the partitioning portion 82 (see FIG. 3) and of the plurality of ribs 90 (see FIG. 3). The first tube shaped portion 108 extends from low to high from a position which is more forward than the opening 66 and more rearward than the opening 84 toward a point which is obliquely forward and upward of the body cover 24c. The first tube shaped portion 108 includes an opening 108a at its upper end portion. The opening 108a opens toward a point which is obliquely forward and upward of the body cover 24c. The first tube shaped portion 108 has its lower edge connected to the upper edges of the pair of side portions 76a of the brim portion 76, the upper edge of the rear portion 76c of the brim portion 76, and the upper edge of the rear portion 80c of the tube shaped portion 80 (see FIG. 3).

In the helicopter 10c, the opening 108a, which is located at a position higher than the opening 84 and the radiator 34 in an area which is more forward than the opening 66 and more rearward than the radiator 34, functions the same way as the opening 86 (see FIG. 13 through FIG. 16) of the second cover 52 (see FIG. 13 through FIG. 16). In other words, in the present preferred embodiment, the opening 108a corresponds to the third air vent portion.

As described above, in the helicopter 10c, the opening 108a functions the same way as the opening 86 of the helicopter 10. Therefore, the helicopter 10c also provides the same functions and advantages as offered by the helicopter 10. Also, in the helicopter 10c, the first tube shaped portion 108 extends from low to high toward a point which is obliquely forward and upward of the body cover 24c, and the first tube shaped portion 108 has its upper end portion provided with the opening 108a. In this case, it is possible to introduce downwash from the main rotor 16 via the opening 108a into the body cover 24c, in addition to the air from ahead of the helicopter 10c. This makes it possible to significantly reduce or prevent a temperature increase inside the body cover 24c more efficiently.

Figure 21:
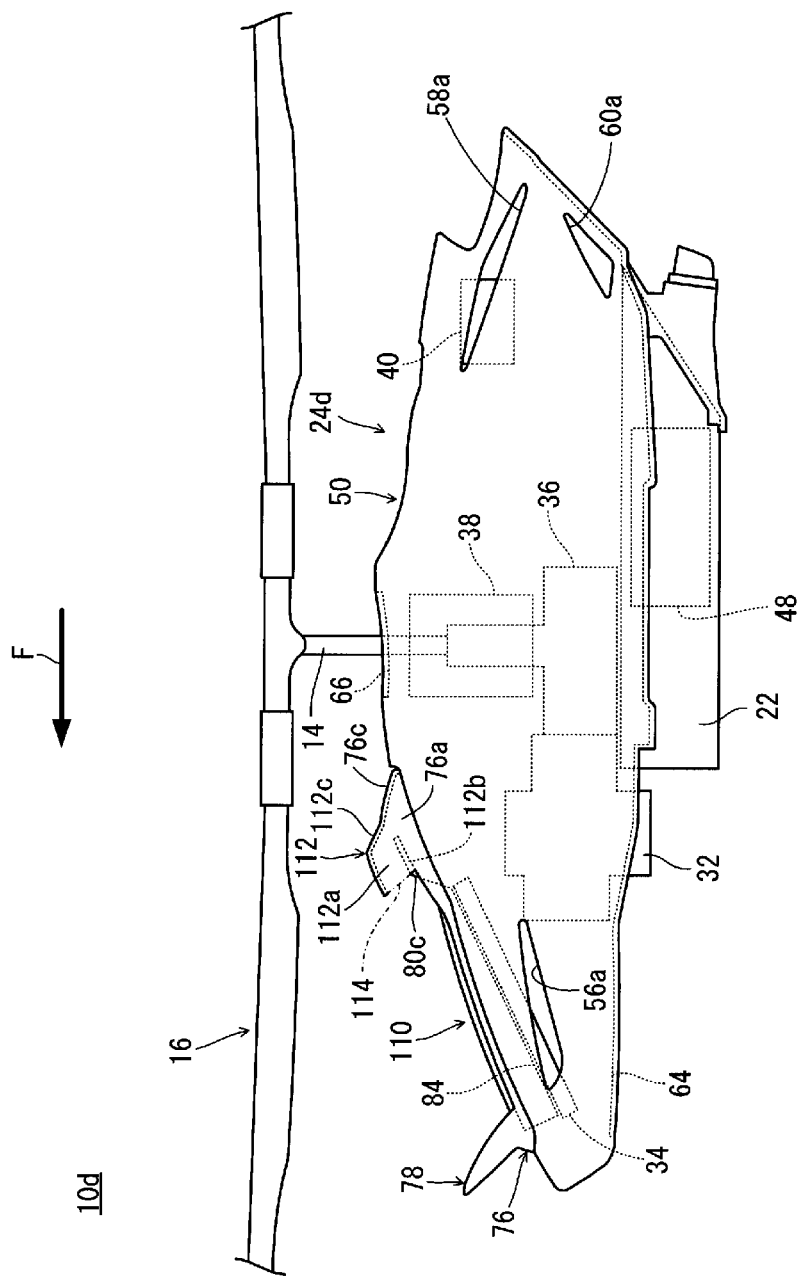
FIG. 21 is a side view showing a primary portion of a helicopter according to still another preferred embodiment of the present invention.

FIG. 21 is a side view showing a primary portion of a helicopter 10d according to still another preferred embodiment of the present invention. Hereinafter, description will be made only for those elements in the helicopter 10d which differ from the helicopter 10. The configurations which are the same as those in the helicopter 10 will not be described.

Referring to FIG. 21, the helicopter 10d differs from the above-described helicopter 10 in that it includes a body cover 24d instead of the body cover 24. The body cover 24d differs from the body cover 24 in that it includes a second cover 110 instead of the second cover 52.

The second cover 110 differs from the second cover 52 in that it includes a labyrinth portion 112 instead of the partitioning portion 82 (see FIG. 3) and of the plurality of ribs 90 (see FIG. 3). The labyrinth portion 112 includes an upper wall portion 112a, a lower wall portion 112b, and a rear wall portion 112c. The upper wall portion 112a preferably has a shape of an inversed letter of U in a front view, and extends in a left-right direction to connect the upper edges of the pair of side portions 76a to each other. The lower wall portion 112b extends in a left-right direction below the upper wall portion 112a to connect two edges (left edge and right edge) of the upper wall portion 112a to each other. The lower wall portion 112b includes a front edge connected to the upper edge of the rear portion 80c of the tube shaped portion 80 (see FIG. 3). The rear wall portion 112c connects a rear edge of the upper wall portion 112a and the upper edge of the rear portion 76c of the brim portion 76. There are sufficient gaps for air to flow through between a rear edge of the lower wall portion 112b and the rear wall portion 112c, and between the rear edge of the lower wall portion 112b and the rear portion 76c.

In the labyrinth portion 112, there is an opening 114 by a front edge of the upper wall portion 112a and the front edge of the lower wall portion 112b. The opening 114 opens at least downward. In the present preferred embodiment, the opening 114 opens obliquely forward and downward. The upper wall portion 112a and the lower wall portion 112b extend from front to rear from the opening 114 in an obliquely rearward and upward direction. In the helicopter 10d, the opening 114 functions the same way as the opening 86 (see FIG. 13 through FIG. 16) of the second cover 52 (see FIG. 13 through FIG. 16). In other words, in the present preferred embodiment, the opening 114 corresponds to the third air vent portion.

As described above, in the helicopter 10d, the opening 114 functions the same way as the opening 86 of the helicopter 10. Therefore, the helicopter 10d also provides the same functions and advantages as offered by the helicopter 10.

In the helicopter 10d, the opening 114 opens obliquely forward and downward. This reduces the likelihood that rain water, dust and dirt, etc. will enter from the opening 114 into the body cover 24d. Further in the helicopter 10d, the upper wall portion 112a and the lower wall portion 112b extend from front to rear from the opening 114 in an obliquely rearward and upward direction. In this case, even if rain water, dust and dirt, etc. have passed through the opening 114, it is possible to sufficiently prevent rain water, dust and dirt, etc. from entering inside the body cover 24d by the upper wall portion 112a and the lower wall portion 112b.

Figure 22:
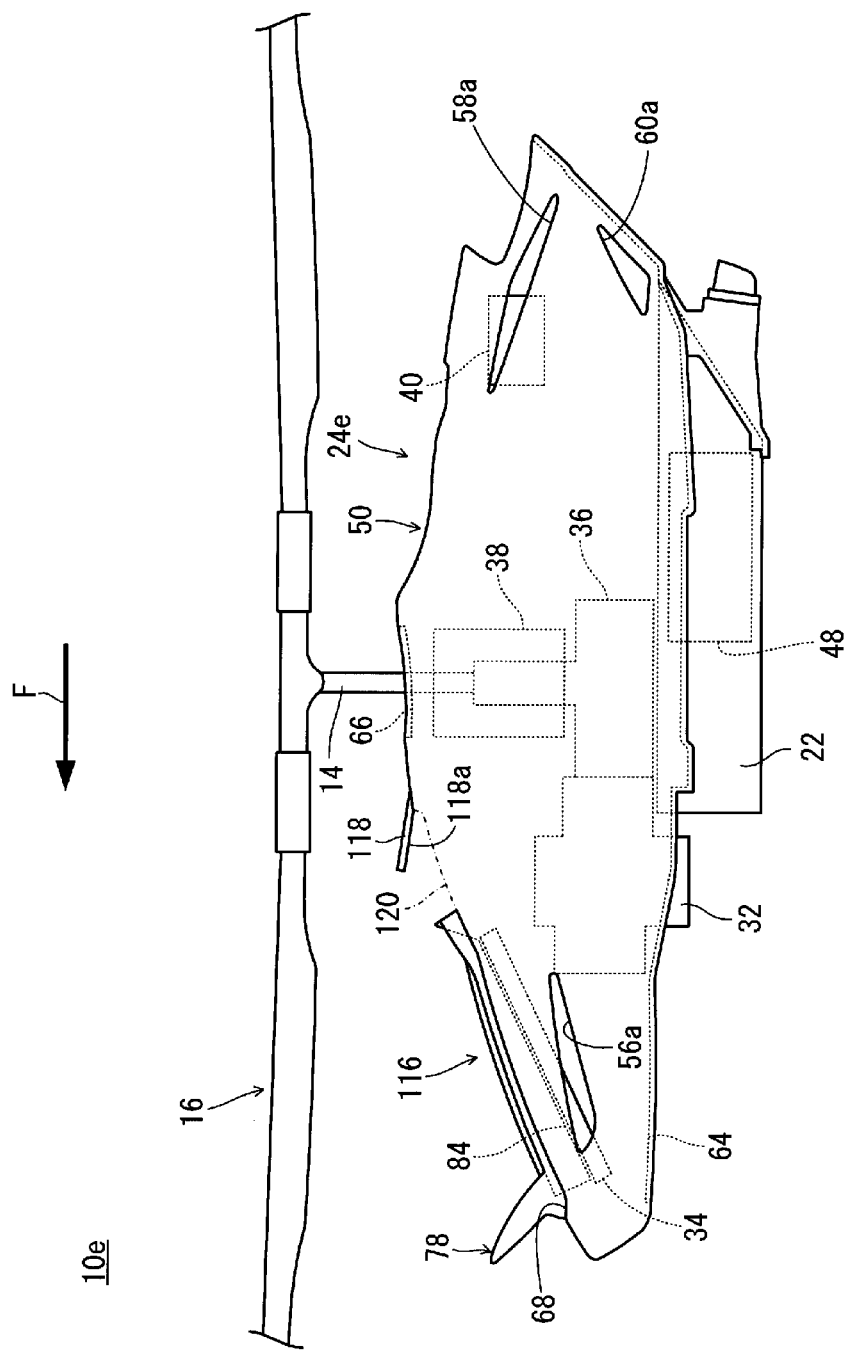
FIG. 22 is a side view showing a primary portion of a helicopter according to another preferred embodiment of the present invention.

FIG. 22 is a side view showing a primary portion of a helicopter 10e according to another preferred embodiment of the present invention. Hereinafter, description will be made only for those elements in the helicopter 10e which differ from the helicopter 10. The configurations which are the same as those in the helicopter 10 will not be described.

Referring to FIG. 22, the helicopter 10e differs from the above-described helicopter 10 in that it includes a body cover 24e instead of the body cover 24. The body cover 24e differs from the body cover 24 in that it includes a second cover 116 and a plate shaped guide portion 118 instead of the second cover 52.

The second cover 116 has a shape of the second cover 52 (see FIG. 9) without a portion, however, which is more rearward than the line B-B. In the helicopter 10e, a region of the opening 68 which is more rearward than the second cover 116 serves as an opening 120. When attached to the first cover 50, the guide portion 118 extends obliquely forward and upward from a rearward end portion of the opening 120. The guide portion 118 has its upper end located at a higher position than an upper end of the sail portion 78. Therefore, a lower surface 118a of the guide portion 118 is visible in a front view of the helicopter 10e.

In the helicopter 10e, the opening 120, which is located at a higher position than the opening 84 and the radiator 34, in an area which is more forward than the opening 66 and more rearward than the radiator 34, functions the same way as the opening 86 (see FIG. 13 through FIG. 16) of the second cover 52 (FIG. 13 through see FIG. 16). In other words, in the present preferred embodiment, the opening 120 corresponds to the third air vent portion. Further, the guide portion 118, which is located at a more rearward and higher position than the opening 84 and extends from low to high toward an obliquely forward and upward point of the body cover 24e, functions the same way as the rear portion 76c (see FIG. 13 through FIG. 16) of the body cover 24 (see FIG. 13 through FIG. 16).

As described above, in the helicopter 10e, the opening 120 functions the same way as the opening 86 of the helicopter 10, whereas the guide portion 118 functions the same way as the rear portion 76c of the helicopter 10. Therefore, the helicopter 10e also provides the same functions and advantages as offered by the helicopter 10.

It should be noted here that the second cover 116 may be replaced by a conventional radiator cover. Also, there may be provided a guide portion which has the same shape as the guide portion 118 as a portion of the first cover.

FIG. 23 is a side view showing a primary portion of a helicopter 10f according to still another preferred embodiment of the present invention. Hereinafter, description will be made only for those elements in the helicopter 10f which differ from the helicopter 10. The configurations which are the same as those in the helicopter 10 will not be described.

Referring to FIG. 23, the helicopter 10f differs from the above-described helicopter 10 in that it includes a body cover 24f instead of the body cover 24. The body cover 24f differs from the body cover 24 in that it includes a second cover 122 instead of the second cover 52. The second cover 122 differs from the second cover 52 in that it further includes a second tube shaped portion 124 extending toward inside the body cover 24f (the first cover 50).

The second tube shaped portion 124 extends obliquely rearward and downward from the rear edge of the partitioning portion 82 (the pair of side portions 82a (see FIG. 3) and the bottom portion 82b), and from the front edge of the rear portion 76c. In the present preferred embodiment, the second tube shaped portion 124 has its lower end portion opening toward the engine 32, the transmission 36, and the electric component 38.

According to the helicopter 10f, the following functions and advantages are obtained in addition to those offered by the helicopter 10. Specifically, in the helicopter 10f, it is possible to introduce air which has passed through the opening 86 and flowing into the body cover 24f to the engine 32, the transmission 36, and the electric component 38 smoothly by the second tube shaped portion 124. Therefore, it is possible to efficiently cool the engine 32, the transmission 36, and the electric component 38.

It should be noted here that the shape of the second tube shaped portion is not limited to the preferred embodiments described above. For example, the second tube shaped portion may have a portion connected to a rear edge of the rear portion 76c, instead of being connected to the front edge of the rear portion 76c.

The helicopters 10a through 10e may also include the second tube shaped portion like the helicopter 10f.

In the helicopters 10 through 10f, the first cover and the second cover may be integral with each other.

Thus far, description has been made for preferred embodiments configured such the third air vent portion preferably is located at a position which is more rearward than the second air vent portion and higher than the second air vent portion and the radiator. However, a portion of the third air vent portion may be located at a lower position than the second air vent portion and/or the radiator.

In the preferred embodiments described above, the pair of openings 58a and the pair of openings 60a were described as an example of the fourth air vent portion. However, the pair of openings 58a or the pair of openings 60a need not be provided. In this case, one of the pair of openings 58a and the pair of openings 60a corresponds to the fourth air vent portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An unmanned helicopter comprising:
a main rotor;
a rotor shaft supporting the main rotor and extending in an up-down direction;
an engine disposed below the main rotor at a more forward position than the rotor shaft and configured to drive the rotor shaft;
a radiator disposed at a more forward position than the engine and configured to dissipate heat from the engine; and
a body cover which houses the engine and the radiator; wherein
the body cover includes a first air vent portion penetrated by the rotor shaft, a second air vent portion located at a position more forward than the first air vent portion and configured to introduce air to the radiator, and a third air vent portion located at a position more forward than the first air vent portion and more rearward than the radiator; and
at least a portion of the third air vent portion is located at a position higher than the second air vent portion and the radiator.

2. The unmanned helicopter according to claim 1, wherein each of the first air vent portion, the second air vent portion, and the third air vent portion includes an opening independent from each other.

3. The unmanned helicopter according to claim 2, wherein the body cover includes a first tube shaped portion extending from low to high toward a point which is obliquely forward and upward of the body cover; and
the third air vent portion is located at an upper end portion of the first tube shaped portion.

4. The unmanned helicopter according to claim 2, wherein the third air vent portion opens downward.

5. The unmanned helicopter according to claim 4, wherein the body cover includes an upper wall portion and a lower wall portion which define the third air vent portion;
the upper wall portion extends from front to rear from the third air vent portion in an obliquely rearward and upward direction; and
the lower wall portion extends from the front to rear from the third air vent portion in an obliquely rearward and upward direction below the upper wall portion.

6. The unmanned helicopter according to claim 1, wherein the second air vent portion and the third air vent portion are included in a common opening, and the first air vent portion is provided by another opening which is independent from the common opening.

7. The unmanned helicopter according to claim 1, wherein the first air vent portion, the second air vent portion, and the third air vent portion are included in a common opening.

8. The unmanned helicopter according to claim 1, wherein the body cover further includes a guide portion configured to introduce air from ahead of the body cover into the body cover.

9. The unmanned helicopter according to claim 8, wherein the guide portion is located at a more rearward and higher position than the second air vent portion, and extends from low to high toward a point which is obliquely forward and upward of the body cover to expose a lower surface of the guide portion in a front view.

10. The unmanned helicopter according to claim 1, wherein the body cover further includes a second tube shaped portion extending toward an inside of the body cover.

11. The unmanned helicopter according to claim 1, wherein the third air vent portion is located above the engine.

12. The unmanned helicopter according to claim 1, wherein the body cover further includes a fourth air vent portion located at a more rearward position than the first air vent portion.

13. The unmanned helicopter according to claim 12, further comprising a frame which supports the engine, and an attitude detector which detects an attitude of the unmanned helicopter; wherein
- at least a portion of the fourth air vent portion is located at a position higher than the frame and more rearward than the rotor shaft; and
- at least a portion of the attitude detector is located at a position higher than the frame and more rearward than the rotor shaft.

* * * * *